(12) United States Patent
Runk et al.

(10) Patent No.: US 10,800,297 B2
(45) Date of Patent: Oct. 13, 2020

(54) SYSTEMS, METHODS, AND APPARATUSES FOR ATTACHING SOFT GOODS TO A CHILD'S APPARATUS

(71) Applicant: GRACO CHILDREN'S PRODUCTS, INC., Atlanta, GA (US)

(72) Inventors: Kelly Runk, Pequea, PA (US); Maureen Tobin, West Chester, PA (US); Brittany Hassler, Philadelphia, PA (US); William Conway, Marietta, GA (US); Nicholas James Lombardi, Atlanta, GA (US); Taylor Daniel Genoway, Atlanta, GA (US)

(73) Assignee: GRACO CHILDREN'S PRODUCTS, INC., Atlanta, GA (US)

( * ) Notice: Subject to any disclaimer, the term of this patent is extended or adjusted under 35 U.S.C. 154(b) by 0 days.

(21) Appl. No.: 16/209,508

(22) Filed: Dec. 4, 2018

(65) Prior Publication Data
US 2019/0168643 A1 Jun. 6, 2019

Related U.S. Application Data

(60) Provisional application No. 62/594,275, filed on Dec. 4, 2017.

(51) Int. Cl.
*A47C 1/08* (2006.01)
*B60N 2/28* (2006.01)
*B60N 2/72* (2006.01)

(52) U.S. Cl.
CPC ......... *B60N 2/2881* (2013.01); *B60N 2/2803* (2013.01); *B60N 2/72* (2013.01); *B60N 2002/2818* (2013.01)

(58) Field of Classification Search
CPC ...... B60N 2/2806; B60N 2/2872; B60N 2/28; B60N 2/2803; B60N 2/2881; B60N 2/2866; B60N 2002/2818; B62B 9/108; B62B 7/145
USPC .... 297/250.1, 219.12, 221, 223, 397, 283.1, 297/283.2
See application file for complete search history.

(56) References Cited

U.S. PATENT DOCUMENTS 5,829,829 A * 11/1998 Celestina-Krevh ..........................
B60N 2/2851
297/219.12
6,296,307 B1 * 10/2001 Holtke ..................... A47D 1/00
297/218.3
7,222,917 B2 * 5/2007 Ward ................... B60N 2/2881
297/219.1

(Continued)

*Primary Examiner* — Chi Q Nguyen
(74) *Attorney, Agent, or Firm* — Eversheds Sutherland (US) LLP

(57) ABSTRACT

A child apparatus can include one or more shells/frames upon which a child can sit or lie. All or a portion of each shell/frame can be covered in soft goods. The soft goods component can include one or more channels or tunnels provided along all or a portion of a perimeter of the soft goods component. One or more stiffening members can be inserted into the one or more channels or tunnels. The shell/frame can include one or more cavities for receiving a portion of the stiffening member therein to couple the soft goods component to the shell/frame. Alternatively, the shell/frame can include soft goods retaining tabs along a back or side of the shell/frame, and the elongated stiffening member can be inserted between each soft goods retaining tab and the back or side of the shell/frame.

20 Claims, 13 Drawing Sheets

(56) References Cited

U.S. PATENT DOCUMENTS

| | | | | |
|---|---|---|---|---|
| 7,344,192 B2* | 3/2008 | Kespohl | ............... | B60N 2/2821 297/230.14 |
| 7,677,661 B1* | 3/2010 | Ferrari-Cicero | ..... | B60N 2/2812 297/219.12 |
| 8,485,601 B2* | 7/2013 | Fair | ......................... | B62B 9/108 297/219.12 |
| 8,585,138 B2* | 11/2013 | Gaudreau, Jr. | ...... | B60N 2/2812 297/216.11 |
| 2004/0061366 A1* | 4/2004 | Meeker | ................ | B60N 2/2806 297/250.1 |
| 2008/0277981 A1* | 11/2008 | Sizemore | ............. | B60N 2/2881 297/219.12 |
| 2009/0167065 A1* | 7/2009 | Kespohl | ............... | B60N 2/2845 297/183.4 |
| 2010/0170039 A1* | 7/2010 | Davis | .................. | A47D 15/006 5/494 |
| 2015/0329015 A1* | 11/2015 | Forbes | ................... | B60N 2/265 297/183.6 |
| 2018/0147963 A1* | 5/2018 | Kim-Perek | .......... | B60N 2/6036 |

\* cited by examiner

SYSTEMS, METHODS, AND APPARATUSES FOR ATTACHING SOFT GOODS TO A CHILD'S APPARATUS

RELATED APPLICATIONS

This application claims priority under 35 U.S.C. § 119 to U.S. Provisional Patent Application No. 62/594,275 filed Dec. 4, 2017, and titled "Systems, Methods, and Apparatuses for Attaching Soft Goods to a Child's Car Seat," the entire contents of which are hereby incorporated herein by reference for all purposes.

TECHNICAL FIELD

The present disclosure is generally directed to apparatuses for infants and children and more particularly to systems, methods, and apparatuses for attaching soft goods to the infant and child apparatuses.

BACKGROUND

Infant and children's apparatuses (hereinafter referred to as "child apparatus" (e.g., child safety seats, child car safety seats, child vehicle booster seats (either with or without a seat back), infant carrier systems, child high chairs, children's rockers (either motorized or non-motorized), bassinets, children's playards, strollers, infant jumpers, children's swings, infant bouncers, infant sleepers, cribs, etc.)) are well-known in the art. The typical child apparatus is configured for the child to sit on or in or to lay on or in the child apparatus to provide a comforting and/or safe environment for the child. Many of these types of child apparatuses are constructed of one or more pieces of molded plastic. While molded plastic shells are described herein, the description is not intended to be limiting, as any method of forming the child apparatus may be used. Additional elements can be coupled to the molded plastic shell(s) of the child apparatus using conventional fasteners, such as screws, bolts, nuts, rivets, pins, and the like. While plastic shell(s) are the most likely material to be used for all or a portion of a child apparatus, other materials may be used to make up all or a portion of the particular child apparatus, such as metal, wood, foam, alloys, polymers, and any other material known to those of ordinary skill in the art.

Most child apparatuses also include soft goods that cover all or at least a portion of the shell of the child apparatus. Examples of soft goods include, but are not limited to, fabric, vinyl, plastic, leather, faux leather, etc. and can be filled, at least partially with foam or other cushioning material. The objective of the soft goods is to provide a softer and/or more comfortable surface along areas that the child will be in contact with the child apparatus. In the example where the child apparatus is a child safety seat, the typical places that soft goods may be applied include the top and front end surfaces of the seat base or seat bottom, the front side of the seat back, and the arm rests (if included). Other areas of the child safety seat may also be covered in the soft goods, as desired.

One problem that can arise with regard to soft goods is how to attach the soft goods to the child apparatus. Some conventional child apparatuses add elastic around the perimeter of the soft goods and use the elasticity of that elastic to attach the soft goods to the child apparatus. Unfortunately, using elastic results in an uncontrolled and unrefined look as it is difficult to ensure where and how the elastic in the soft goods will "grip" onto the frame and/or shell of the child apparatus. Other conventional child apparatuses use a two (or more)-piece shell or frame concept to sandwich the outer edges of the soft goods between. Unfortunately, sandwiching the soft goods between two frame parts increases the complexity of the child apparatus and can make it more difficult for the end user to take apart and put back together when the soft goods need to be cleaned.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF THE EXAMPLE EMBODIMENTS

Figure 1A:
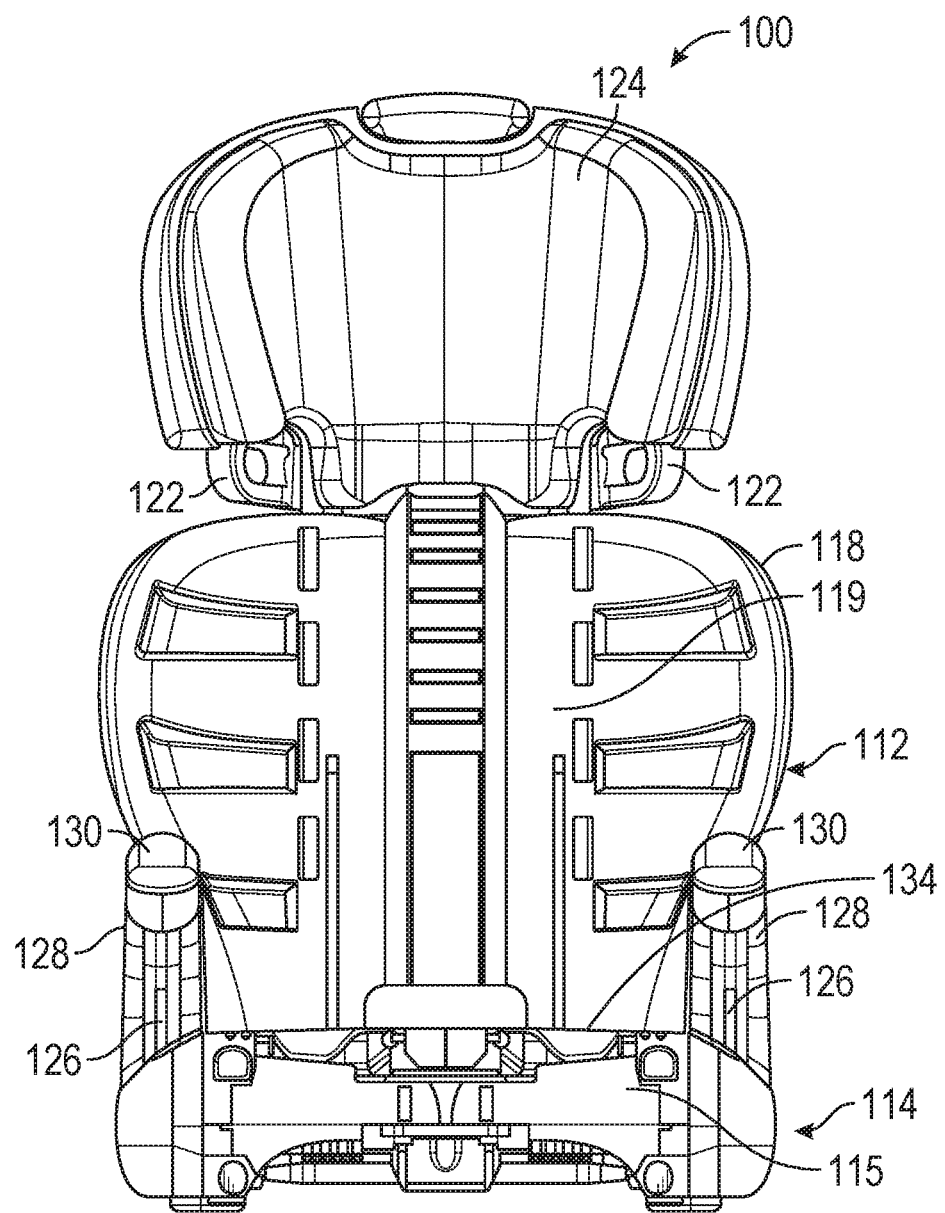
FIG. 1A is a front elevation view of one example of a child apparatus in the form of a child safety seat constructed in accordance with one example embodiment of the disclosure.

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Certain relationships between features of the child apparatus are described herein using the term "substantially" or "substantially equal". As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially parallel" indicates that the parallel relationship is not a strict relationship and does not exclude functionally similar variations therefrom. As used herein, the term "substantially orthogonal" indicates that the orthogonal relationship is not a strict relationship and does not exclude functionally similar variations therefrom.

FIGS. 1A-F are various views of one example of a child apparatus 100 in the form of an example child safety seat 100 showing a novel way of removably coupling soft goods in accordance with one example embodiment of the disclosure. While the example of FIGS. 1A-F present and describe the child apparatus 100 as a child safety seat, this is for example purposes only as any other form of child apparatus (e.g., child safety seats, child car safety seats, child vehicle booster seats (either with or without a seat back), infant carrier systems, child high chairs, children's rockers (wither motorized or non-motorized), bassinets, children's playards, strollers, infant jumpers, children's swings, infant bouncers, infant sleepers, cribs, etc.) may be substituted for the child safety seat shown and described with reference to FIGS. 1A-F and used in conjunction with the soft goods described throughout this application.

Now referring to FIGS. 1A-F, the example child apparatus in the example form of a child safety seat 100 can be a child vehicle booster seat with a seat back that can include one or more shell portions. In one example, the child safety seat include a first shell for a seat back 112 and a second shell for a seat base 114. In some example embodiments, the seat back 112 and seat base 114 may be formed as one unitary piece and can define a single shell. In other example embodiments, the seat back 112 and seat base 114 may be formed from two or more separate pieces defining two or more separate shells that are joined together during manufacturing and/or by the parent/caregiver. The seat back 112 may be fixedly, removably, and/or rotatably coupled to the seat base 114.

The seat base 114 can include a top surface 134 or seat bottom 134 and an opposing bottom surface 135. The bottom surface 135 can be configured to rest upon the top surface of the vehicle seat (not shown), as understood by those of ordinary skill in the art. The top surface or seat bottom 134 of the seat base 114 is configured to be sat upon by a child. In certain example embodiments, the top surface or seat bottom 134 can be angled downward from the front 115 of the seat base 114 towards the back 117 of the seat base 114 to better position the child within the child safety seat 100. All or a portion of the top surface or seat bottom 134 can also be covered in padding and/or soft goods (e.g., fabric, vinyl, plastic, leather, faux leather, etc. and can be also include foam or other cushioning material that fills all or a portion of the soft goods material) to increase the comfort of the top surface or seat bottom 134 of the seat base 114.

In addition, the child safety seat 100 can also include a pair of armrests 120. In some example embodiments, each armrest 120 may be coupled to the seat base 114 and can extend generally vertically upward from the seat base 114. In certain example embodiments, each armrest 120 can be positioned along opposing lateral sides of the seat base 114. In one example, each armrest 120 can include a vertical support member 128 that has a first end coupled to or integrally formed with the seat base 114 and extends vertically upward from the seat base 114. The armrest 120 can further include a horizontal support member 130 coupled to or integrally formed with the vertical support member 128. The example horizontal support member 130 can be positioned along the top end of the vertical support member 128 and extend horizontally out therefrom to provide a larger contact area for the child's arm to rest on. In one example, the horizontal support member 130 can be vertically adjustable with respect to the vertical support member 128 or the seat base 114 to allow the armrest 120 to be raised and lowered. In addition, the horizontal support member 130 can include padding and/or soft goods (e.g., fabric, vinyl, plastic, leather, faux leather, etc. and can be also include foam or other cushioning material that fills all or a portion of the soft goods material) at least along the top side of the horizontal support member 130 to provide additional comfort. In alternative example embodiments, the armrests 120 may be coupled to the seat back 112 and extend generally forward from the seat back 112.

The child safety seat 100 may also include one or more lap belt guides 126. Each lap belt guide 126 is configured to properly position the vehicle lap belt (e.g., from a vehicle 3-point seat belt (not shown)) across the lap of the child when the child is sitting on the top surface or seat bottom 134 of the seat base 114 of the child safety seat 100. In certain example embodiments, each lap belt guide 126 is positioned adjacent to a corresponding armrest 120 and along the top surface 134 of the seat base 114. In one example, the lap belt guide 126 creates a transition surface between a forward surface of the vertical support 128 of the armrest 120 and a top surface or seat bottom 134 of the seat base 114 for properly positioning the lap belt (not shown). In some example embodiments, the lap belt guide 126 may be attached to or integrally formed as a part of the vertical support 128 of the armrest 120. In other example embodiments, the lap belt guide 126 may be attached to or integrally formed with at least a portion of the seat base 114. In another example embodiment, elements of the seat base 114 and vertical support 128 may combine to create the seat belt guide. In one example embodiment, the lap belt guide 126 may include a flat or rounded surface the lap belt extends over and abuts. In another example embodiment, the lap belt guide 126 may include additional features to secure or otherwise direct the lap belt.

The seat back 112 can include a backrest 118 that extends generally vertically upward with respect to the seat base 114. The backrest 118 can include a front side 119 and an opposing back side 121. The front side 119 of the backrest 118 can be configured to receive a portion of a child's back thereon. In one example, the front side 119 of the backrest 118 and the seat bottom 134 of the seat base 114 can define a child receiving area for the child apparatus presented in this example as a child safety seat 100. In other example embodiments of the child apparatus, the child receiving area is the area or portion of the child apparatus upon which the child/infant is supposed to sit or lay on the child apparatus. In the example child safety seat 100, all or a portion of the backrest 118 can include padding and/or soft goods (e.g., fabric, vinyl, plastic, leather, faux leather, etc. and can be also include foam or other cushioning material that fills all or a portion of the soft goods material) to increase the comfort of the front side 119 of the backrest 118.

In some example embodiments, the seat back 112 or another shell of a child apparatus may contain one or more lateral supports 116. In the example shown, two lateral supports 116 are provided. Each lateral support 116 can be positioned along opposing, vertically extending side edges of the seat back 112. Each lateral support 116 can be integrally formed with or coupled to the seat back 112. Each lateral support 116 can extend along a portion of one of the opposing outer vertical edges of the seat back 112 and can be positioned generally between the seat base 114 and the headrest 124. Each lateral support 116 can also extend from the backrest 118 of the seat back 112 and generally forward from the front side 119 of the backrest 118 to help keep the child securely positioned within the outer boundaries of the child safety seat 100 during lateral acceleration or deceleration.

The back side 121 of the seat back 112 can include one or more means for coupling soft goods to the seat back 112, as discussed herein. In one example, those means can include cavities, gaps, openings, or slots, as described below. Each cavity, gap, opening, or slot can be configured to receive therein at least a portion of a support frame and/or elongated stiffening member for the soft goods.

In one example, the back side 121 of the seat back 112 can include one or more horizontally-extending support ribs. Each rib can be a thicker portion of the shell or frame or can be applied on top of and coupled to the frame and can be configured to provide lateral support to the seat back 112 or other shell. For example, the back side 121 of the seat back 112 can include a first support rib 142 that extends generally horizontally from the left lateral edge of the seat back 112 and/or lateral support 116 towards the centerline Y of the longitudinal axis of the seat 100. The first support rib 142 can extend in a direction orthogonal or substantially orthogonal to the longitudinal axis Y of the seat back 112 or other shell. The back side 121 of the seat back 112 or other shell can also include a second support rib 144 that is positioned vertically below the first support rib 142 and extends generally horizontally from the left lateral edge of the seat back 112 and/or lateral support 116 towards the centerline Y of the longitudinal axis of the seat 100. The second support rib 144 can extend in a direction orthogonal or substantially orthogonal to the longitudinal axis Y of the seat back 112 or other shell. The back side 121 of the seat back 112 or other shell can also include a third support rib 146 that is positioned vertically below the first support rib 142 and the second support rib 144 and extends generally horizontally from the left lateral edge of the seat back 112 and/or lateral support 116 towards the centerline Y of the longitudinal axis seat back 112 or other shell. The third support rib 146 can extend in a direction orthogonal or substantially orthogonal to the longitudinal axis Y of the seat back 112 or other shell. In one example, each of the ribs 142, 144, 146 extend to points along substantially the same vertical plane Z that is offset from but parallel or substantially parallel to the longitudinal axis Y of the seat back 112 or other shell.

The back side 121 of the seat back 112 or other shell can also include a first vertically or substantially vertically extending support rib 154. In one example, the support rib 154 can extend vertically or substantially vertically along the back side 121 of the seat back 112 or other shell from the top end of the back rest 118 towards the bottom end of the back rest 118 and adjacent one end of each of the support ribs 142, 144, 146 as shown in FIGS. 1C-E. The support rib 154 can be a thicker portion of the shell or frame (such as a vertically extending planar member) or can be a separate member applied on top of and coupled to the frame and can be configured to provide vertical support to the seat back 112 or other shell.

Cavities, gaps, slots, or openings can be created between one end of each respective support rib 142, 144, 146, and the vertical support rib 154. For example, a first cavity 158 can be provided between the first support rib 142 and the vertical support rib 154. In one example, the first cavity 158 is defined by the first support rib 142, the vertical support rib 154 and the back side 121 of the backrest 118. In certain example embodiments, the first cavity 158 can have rectangular or trapezoidal cross-section or another cross-section that reduces in width the deeper you go into the cavity 158 and can be configured to receive a portion of the soft goods support frame (e.g., a portion of an elongated stiffening member provided on the soft goods) therein and hold that portion of the soft goods support frame via a friction fit.

A second cavity 160 can be provided between the second support rib 144 and the vertical support rib 154. In one example, the second cavity 160 is defined by the second support rib 144, the vertical support rib 154, and the back side 121 of the backrest 118. In certain example embodiments, the second cavity 160 can have rectangular or trapezoidal cross-section or another cross-section that reduces in width the deeper you go into the cavity 160 and can be configured to receive a second portion of the soft goods support frame therein (e.g., a second portion of an elongated stiffening member provided on the soft goods) and hold that second portion of the soft goods support frame within the second cavity 160 via a friction fit.

A third cavity 162 can be provided between the third support rib 146 and the vertical support rib 154. In one example, the third cavity 162 is defined by the third support rib 146, the vertical support rib 154, and the back side 121 of the backrest 118. In certain example embodiments, the third cavity 162 can have rectangular or trapezoidal cross-section or another cross-section that reduces in width the deeper you go into the cavity 162 and can be configured to receive a third portion of the soft goods support frame therein (e.g., a third portion of an elongated stiffening member provided on the soft goods) and hold that third portion of the soft goods support frame within the third cavity 162 via a friction fit.

The back side 121 of the seat back 112 or other shell can also include a fourth horizontally-extending support rib 148 that extends generally from the right lateral edge of the seat back 112 and/or lateral support 116 towards the centerline Y of the longitudinal axis of the seat back 112 or other shell. The fourth horizontally-extending rib 148 can extend in a direction orthogonal or substantially orthogonal to the longitudinal axis Y of the seat back 112 or other shell. The back side 121 of the seat back 112 can also include a fifth horizontally-extending support rib 150 that is positioned vertically below the fourth horizontally-extending support rib 142 and extends generally from the right lateral edge of the seat back 112 and/or lateral support 116 towards the centerline Y of the longitudinal axis of the seat back 112 or other shell. The fifth horizontally-extending rib 150 can extend in a direction orthogonal or substantially orthogonal to the longitudinal axis Y of the seat back 112 or other shell. The back side 121 of the seat back 112 can also include a sixth horizontally-extending support rib 152 that is positioned vertically below the fourth horizontally-extending support rib 148 and the fifth horizontally-extending support rib 150 and extends generally from the right lateral edge of the seat back 112 and/or lateral support 116 towards the centerline Y of the longitudinal axis of the seat back 112 or other shell. The sixth horizontally-extending rib 152 can extend in a direction orthogonal or substantially orthogonal to the longitudinal axis Y of the seat back 112 or other shell. In one example, each of the ribs 148, 150, 152 extend to points along substantially the same vertical plane W that is offset from but parallel or substantially parallel to the longitudinal axis Y and/or the vertical plane Z.

The back side 121 of the seat back 112 or other shell can also include a second vertically or substantially vertically extending support rib 156. In one example, the second vertical support rib 156 can extend vertically or substantially vertically along the back side 121 of the seat back 112 or other shell from the top end of the back rest 118 towards the bottom end of the back rest 118 and adjacent one end of each of the support ribs 148, 150, 152 as shown in FIGS. 1C, 1D, and 1F. The second vertical support rib 156 can be a thicker portion of the shell or frame (such as a vertically extending planar member) or can be a separate member applied on top of and coupled to the frame and can be configured to provide vertical support to the seat back 112 or other shell.

Cavities, gaps, slots, or openings can also be created between one end of each respective support rib 148, 150, 152 and the second vertical support rib 156. For example, a fourth cavity 164 can be provided between the fourth support rib 148 and the second vertical support rib 156. In one example, the fourth cavity 164 is defined by the fourth support rib 148, the second vertical support rib 156 and the back side 121 of the backrest 118. In certain example embodiments, the fourth cavity 164 can have rectangular or trapezoidal cross-section or another cross-section that reduces in width the deeper you go into the cavity 164 and can be configured to receive a fourth portion of the soft goods support frame therein (e.g., a fourth portion of an elongated stiffening member or a first portion of a second elongated stiffening member provided on the soft goods) and hold that fourth portion of the soft goods support frame in the fourth cavity 164 via a friction fit.

A fifth cavity 166 can be provided between the fifth support rib 150 and the second vertical support rib 156. In one example, the fifth cavity 166 is defined by the fifth support rib 150, the second vertical support rib 156, and the back side 121 of the backrest 118 or other shell. In certain example embodiments, the fifth cavity 166 can have rectangular or trapezoidal cross-section or another cross-section that reduces in width the deeper you go into the cavity 166 and can be configured to receive a fifth portion of the soft goods support frame therein (e.g., a fifth portion of an elongated stiffening member or a second portion of a second elongated stiffening member provided on the soft goods) and hold that fifth portion of the soft goods support frame within the fifth cavity 166 via a friction fit.

A sixth cavity 168 can be provided between the sixth support rib 152 and the second vertical support rib 156. In one example, the sixth cavity 168 is defined by the sixth support rib 152, the second vertical support rib 156, and the back side 121 of the backrest 118 or other shell. In certain example embodiments, the sixth cavity 168 can have rectangular or trapezoidal cross-section or another cross-section that reduces in width the deeper you go into the cavity 168 and can be configured to receive a sixth portion of the soft goods support frame therein (e.g., a sixth portion of an elongated stiffening member or a third portion of a second elongated stiffening member provided on the soft goods) and hold that sixth portion of the soft goods support frame within the sixth cavity 168 via a friction fit.

While the example embodiment described above and shown in FIGS. 1A-F presents a seat back 112 with three generally horizontally extending ribs along each side of the seat back 112 or other shell and a total of six cavities, this is for example purposes only, as fewer or greater generally horizontally extending ribs and fewer or greater cavities (e.g., any number greater than one along each side) as well as fewer or greater than the two generally vertically extending support ribs can be provided. Further, while the example embodiment of a child apparatus described above and shown in FIGS. 1A-F describes the cavities being defined by the generally horizontally extending rib, the vertical rib and the backrest 118, this is also for example purposes only. In other example embodiments, the cavities or slots can be molded into the back side 121 of the backrest 118 or other shell or along a side of the backrest 118 or other shell separate and distinct from (and in some embodiments without) the vertical rib and the respective generally horizontally extending ribs.

Figure 1B:
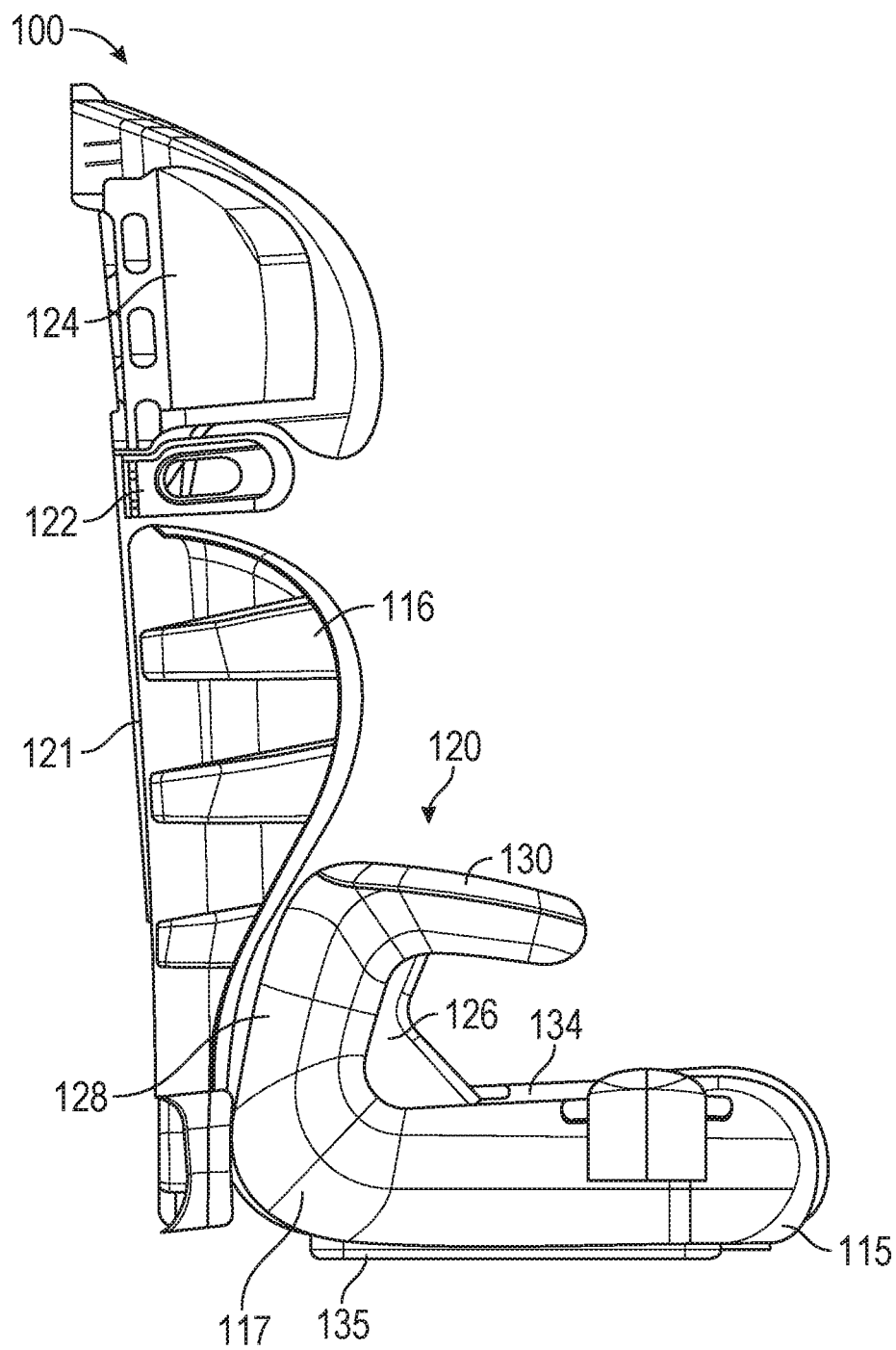
FIG. 1B is a side elevation view of the child safety seat of FIG. 1A.
Figure 1C:
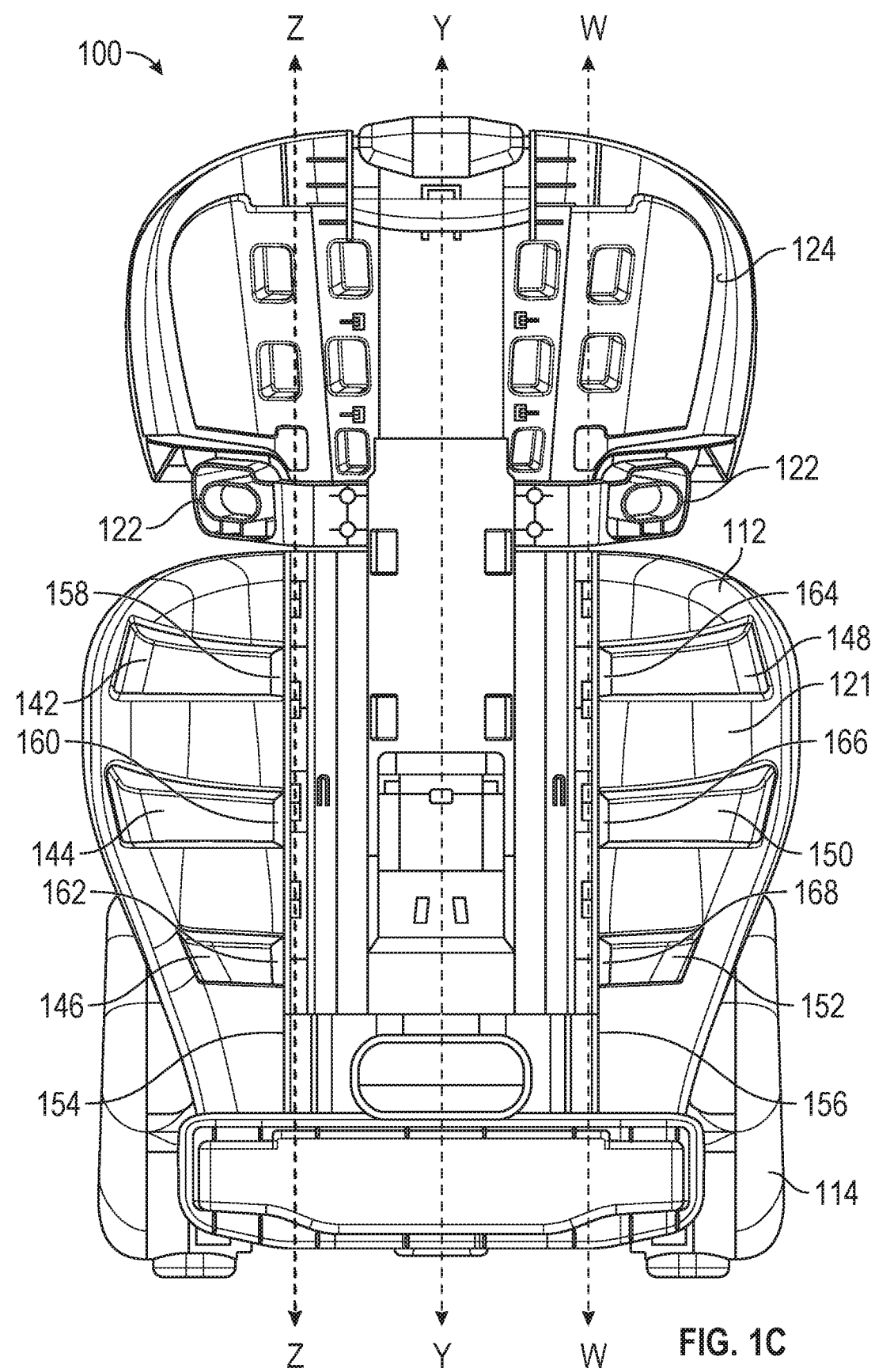
FIG. 1C is a rear elevation view of the child safety seat of FIGS. 1A-B.
Figure 1D:
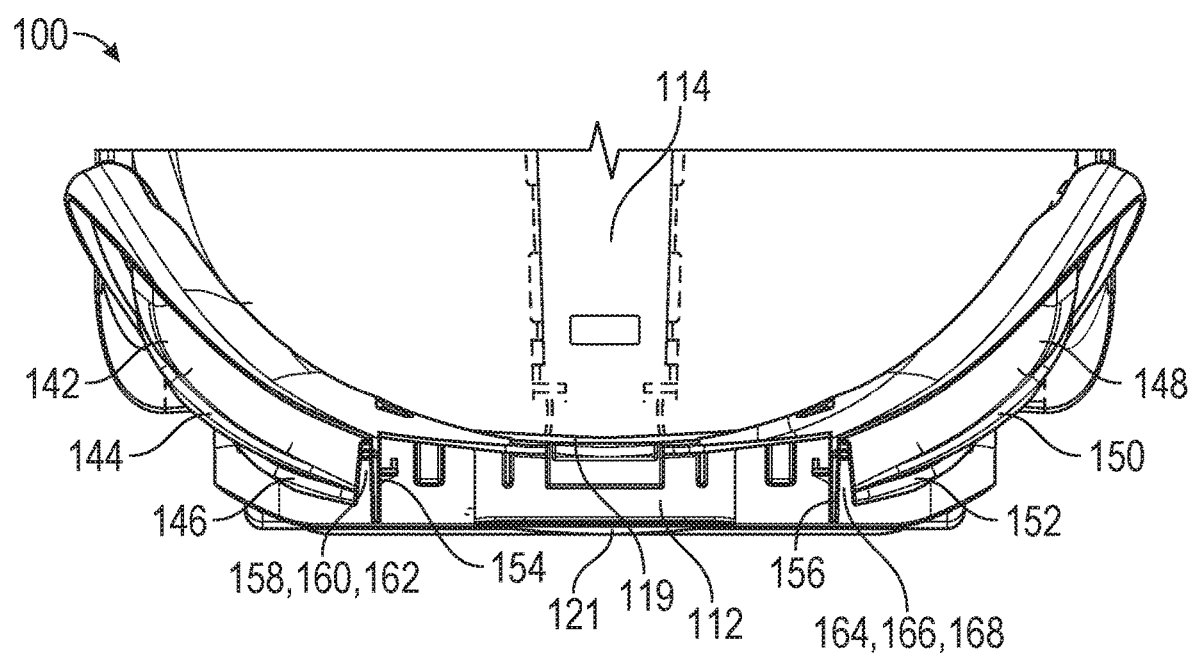
FIG. 1D is a partial top plan view of the child safety seat of FIGS. 1A-C.
Figure 1E:
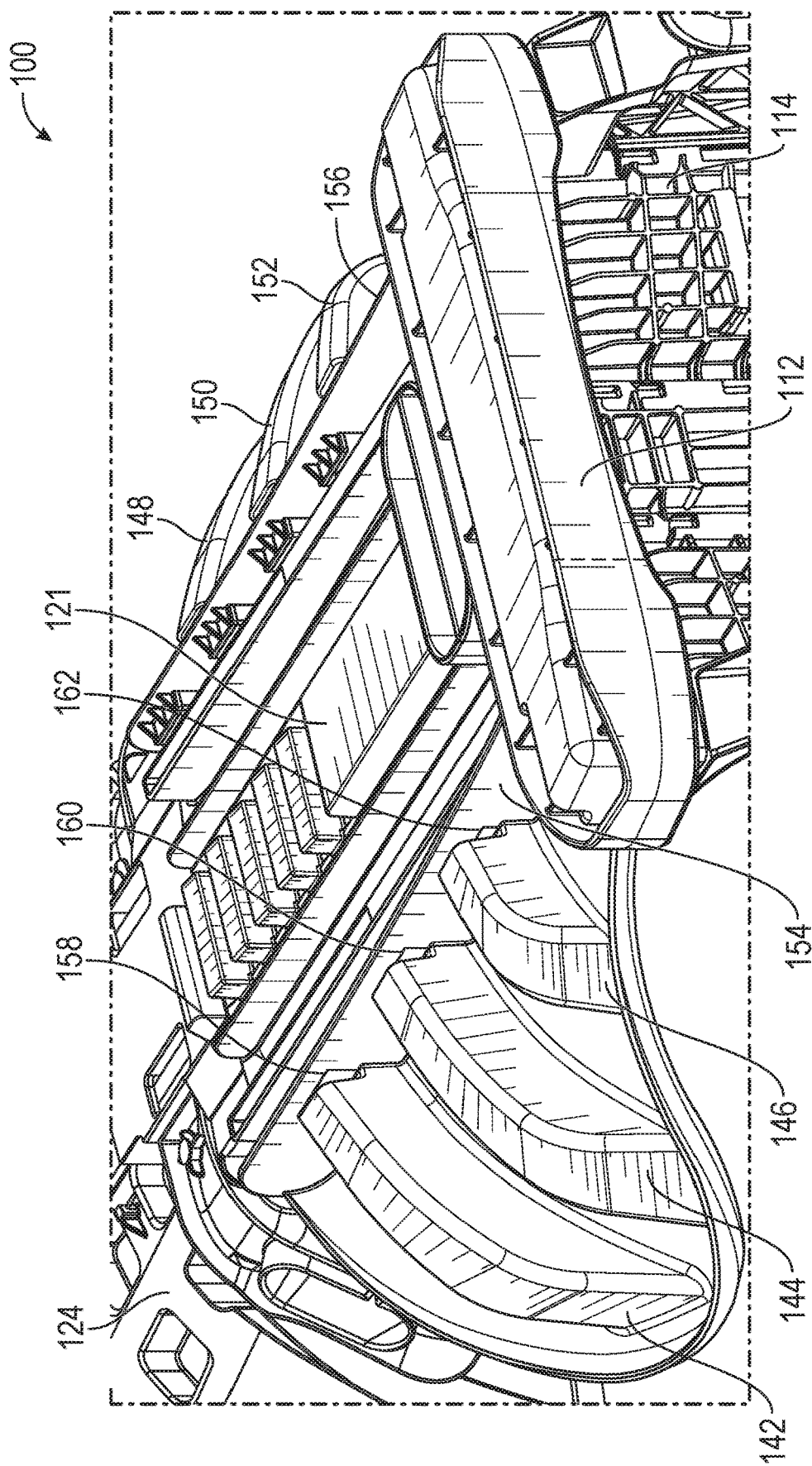
FIG. 1E is a partial rear perspective view of the child safety seat of FIGS. 1A-D.
Figure 1F:
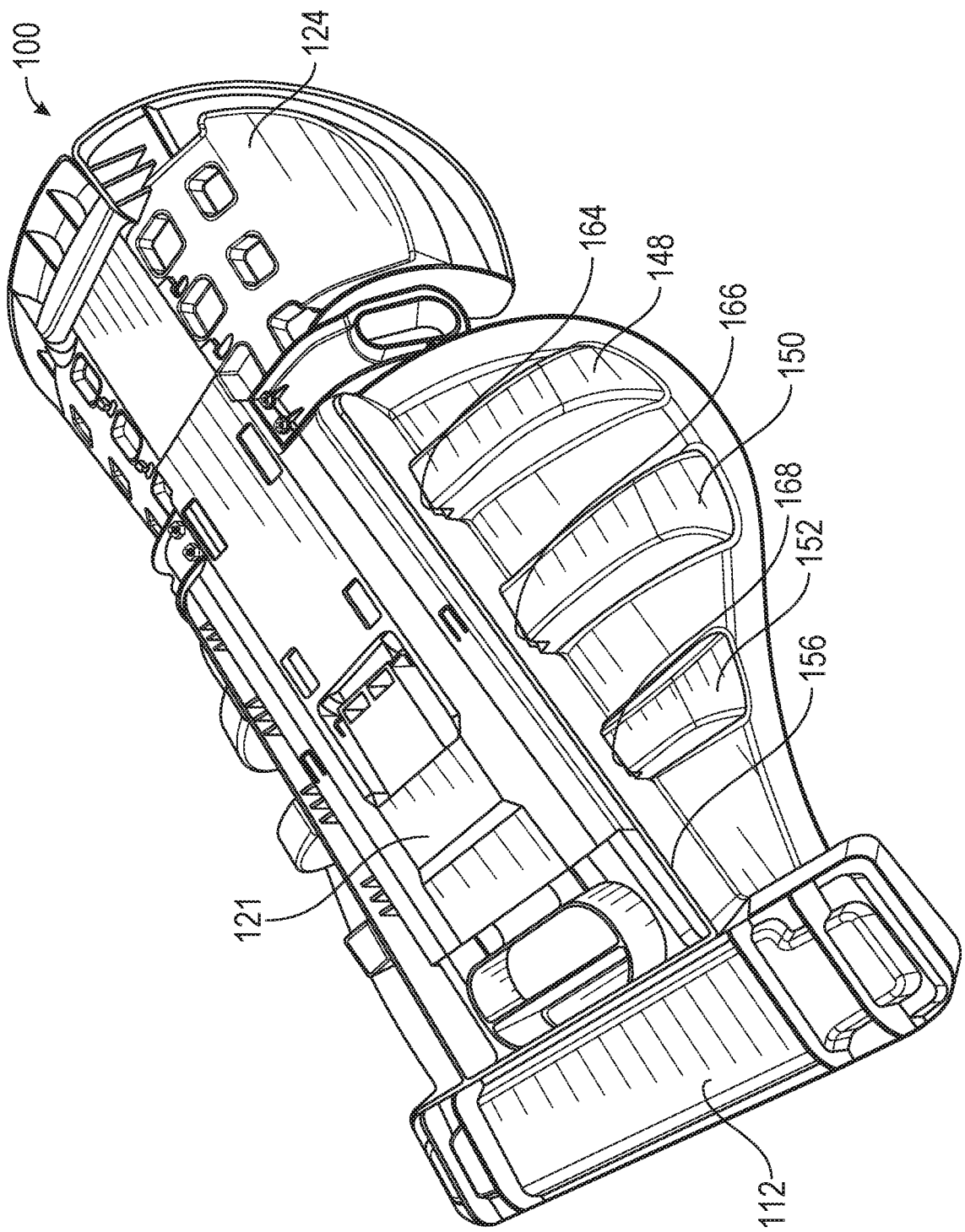
FIG. 1F is another partial rear perspective view of the child safety seat of FIGS. 1A-E.

The child apparatus presented in the form of a child safety seat 100 in FIGS. 1A-F may also include other elements that guide and position the vehicle's three-point seatbelt (not shown). In one example embodiment, the child safety seat 100 includes one or more shoulder belt guide 122. Each shoulder belt guide 122 can be positioned along the seat back 112 near or adjacent the headrest 124 and generally above the lateral support 116 so as to be positioned near each of the occupant's shoulders as shown in FIG. 1A-B. The shoulder belt guide 122 may be coupled to or integrally formed with the seat back 112, the backrest 118, or the headrest 124 or another shell and can be positioned between the backrest 118 and the headrest 124. Each shoulder belt guide 122 may include a channel, for example, an oblong channel, that the seatbelt can pass freely therethrough. In some example embodiments, the outer wall of the shoulder belt guide 122 may have an opening or other break in the wall to allow the seatbelt to be fed into the channel of the shoulder belt guide 122 while making it difficult for the belt to be unintentionally removed from the belt guide 122. Once the seatbelt is in place within the channel of the shoulder belt guide 122, the shoulder belt guide 122 can maintain the shoulder belt in the proper position across the child's torso while still allowing the belt to be extended and retracted during buckling and unbuckling of the child into the child safety seat 100. Other example embodiments of the child safety seat 100 or other child apparatus may utilize different shoulder belt guide configurations. For example, a strap with one end fixed to the child safety seat 100 may be looped over the seatbelt with the other end removably snapped or coupled to the child safety seat 100. In other example embodiments, the shape of the headrest 124, backrest 118, and/or lateral supports 116 may provide an integrated pathway to guide and secure the shoulder belt.

In certain example embodiments, the seat back 112 or other shell may be adjustable to fit different occupants and vehicles. In one example, the seat back 112 or other shell may include a vertically adjustable headrest 124 that may be slidably or otherwise vertically adjustably coupled to the backrest 118 to fit occupants of different heights. The headrest 124 can include a lever configured to decouple the headrest 124 from the seat back 112 or other shell and allow the headrest 124 to be vertically adjusted up or down with respect to the backrest 118. Releasing the lever can then allow the headrest 124 to lock in one of multiple vertical positions along the backrest 118.

In certain example embodiments, the child apparatus presented in the form of a child safety seat 100 can also include a seat back 112 or other shell that is selectively pivotally attached to the seat base 114 or other shell, allowing the seat back 112 or other shell to be reclined at different seat back angles (with respect to the seat base 114 or other shell). In certain example embodiments, the seat back 112 and seat base 114 may be selectively removable, allowing the seat base 114 or other shell to be separated from the seat back 112 or other shell such that the seat base 114 or other shell can be used alone as a booster seat without the seat back 112. In one example, the seat back 112 or other shell can include one or more cavities positioned near the bottom edge of the seat back 112 or other shell. Each cavity can be configured to receive one of one or multiple tabs extending out from the back 117 of the seat base 114 or other shell. In another example, the seat back 112 or other shell may include one or more hooks positioned along a bottom edge of the seat back 112 or other shell for removably and rotatably coupling the seat back 112 or other shell to the seat base 114 or another shell. In this example, the seat base 114 or another shell can include one or more corresponding pins, bars, or axles (not shown) positioned along a back 117 of the seat base 114 or another shell to which the one or more hooks of the seat back 112 or other shell can rotatably couple to and decouple from.

Figure 2A:
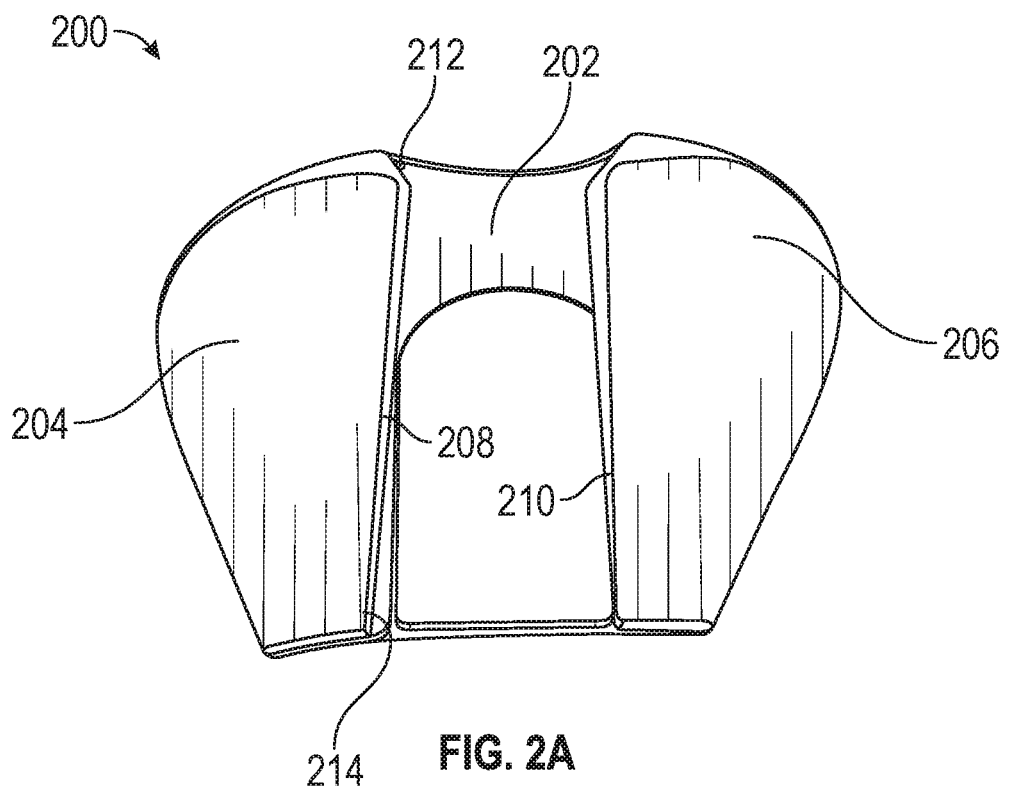
FIGS. 2A-B present a soft goods seat back panel to be connected to the child safety seat of FIGS. 1A-F constructed in accordance with one example embodiment of the disclosure.
Figure 2B:
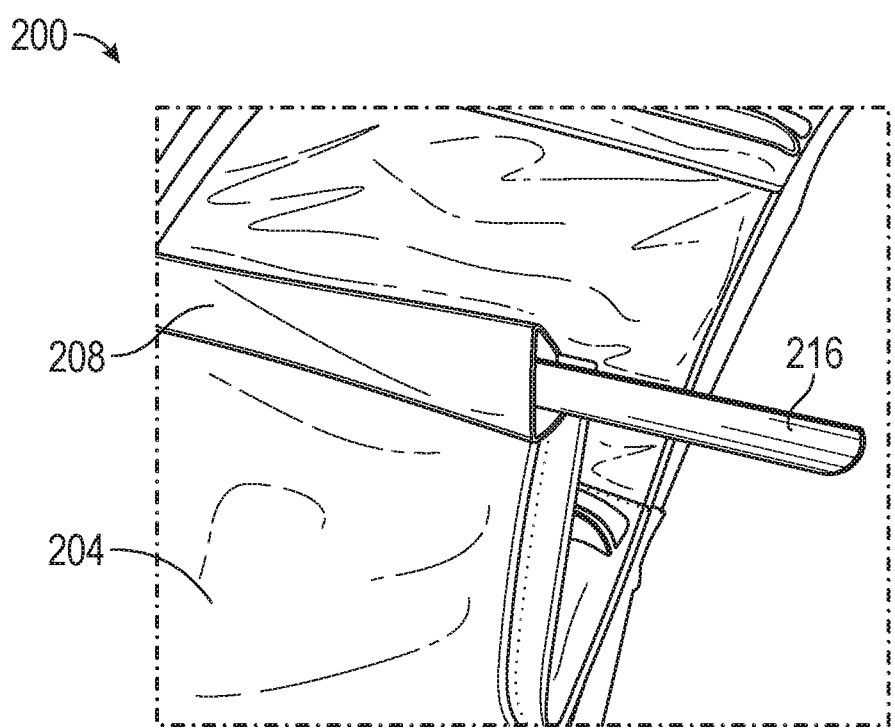

FIGS. 2A-B present a pair of views of a soft goods component in the example form of a soft goods seat back panel 200 configured to be removably coupled to the child apparatus presented in the form of a child safety seat 100 of FIGS. 1A-F according to one example embodiment of the disclosure. Referring now to FIGS. 1A-F and 2A-B, the example soft goods component presented in the form of an example soft good seat back panel 200 can include a front-facing panel 202, a first rear-facing panel 204 provided on the left lateral edge of the front-facing panel 202 and a second rear-facing panel 206 provided on the opposing right lateral edge of the front-facing panel 202. The front-facing panel 202, the first rear-facing panel 204, and the second rear-facing panel 206 can be integrally formed or separately made and coupled together (e.g., via sewing). All or a portion of each of the front-facing panel 202, the first rear-facing panel 204, and the second rear-facing panel 206 can include soft-goods material (e.g., fabric, vinyl, plastic, leather, faux leather, etc. and can be also include foam or other cushioning material that fills all or a portion of the soft goods material) that can include elastic material.

The front-facing panel 202 can be sized and shaped to cover all or a portion of the front side 119 of the backrest 118 of the seat back 112 or other shell. The first rear-facing panel 204 can be sized and shaped to cover a portion of the back side 121 of the backrest 118 (e.g., at least a portion of the left half of the backrest 118) of the seat back 112 or other shell and the second rear-facing panel 206 can be sized and shaped to cover a separate portion of the back side 121 of the backrest 118 (e.g., at least a portion of the right half of the backrest 118) of the seat back 112 or other shell.

The first rear-facing panel 204 can include an enclosed channel or tunnel 208 positioned along one lateral edge of the first rear-facing panel 204. In one example, the channel or tunnel 208 can extend from substantially the top end 212 to substantially the bottom end 214 of the first rear-facing panel 204 or along any other portion of the seat back panel 200. The second rear-facing panel 206 can also include an enclosed channel or tunnel 210 positioned along one lateral edge of the second rear-facing panel 206. In one example, the channel or tunnel 210 can extend from substantially the top end 212 to substantially the bottom end 214 of the second rear-facing panel 206 or along any other portion of the seat back panel 200. Each of the channels or tunnels 208, 210 can include an elongated passageway configured to receive (e.g., slidably) therein an elongated member 216. For example, a first elongated member 216 can be slidably inserted into the first tunnel 208 and a second elongated member 216 can be slidably inserted into the second tunnel 210. In another example embodiment, a single elongated member 216 can be provided- that can be slidably inserted into the first tunnel 208 and the second tunnel 210.

The elongated members 216 can be made, for example, of plastic, metal, metal alloy, composites, and/or wood. In one example, the elongated member 216 is made of extruded plastic. The elongated member 216 is typically stiffer and less pliable than the rest of the soft goods material 206, and is able to maintain its shape under the mild compression that can be applied in the cavity by the adjacent walls of the corresponding generally horizontally and vertically extending ribs. Each elongated member 216 can have an elongated body with a cross-sectional shape. The cross-sectional shape can be rectangular, square, trapezoidal, oval, circular, or any other geometric shape.

In another example embodiment, the first tunnel 208 and the second tunnel 210 can be combined into a single tunnel, and a single elongated member 216 can be inserted into that tunnel. In another example embodiment, rather than a single tunnel 208, 210 along the lateral edge of the first 204 and second 206 rear-facing panels, multiple shorter tunnels or channels can be provided along those same lateral edges at positions associated with the cavities 158, 160, 162, 164, 166, and 168 and multiple correspondingly shorter elongated members can be inserted into each respective shorter tunnel or channel.

Figure 3:
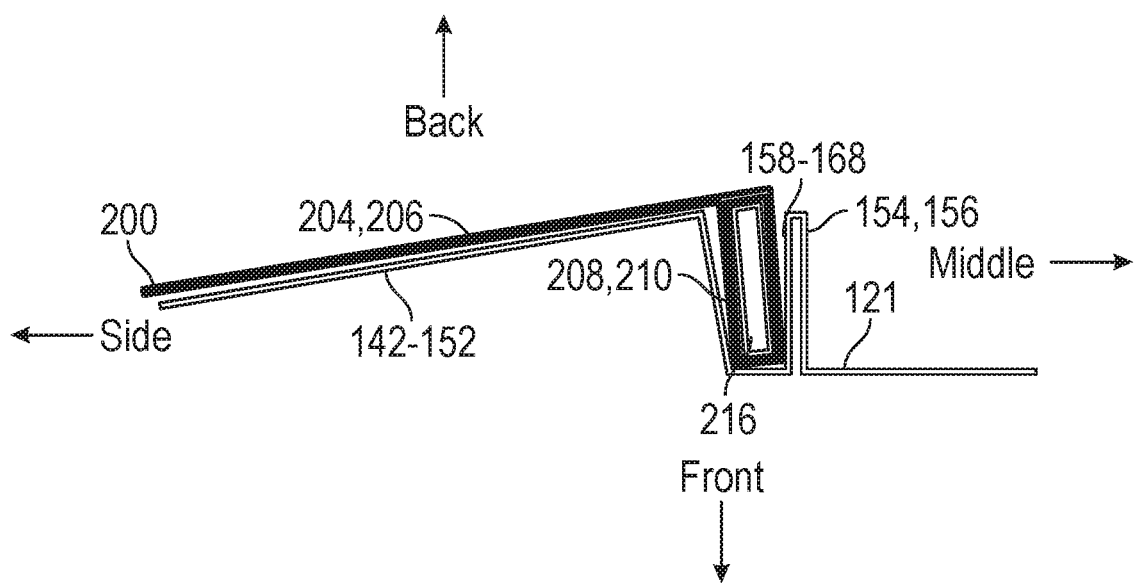
FIG. 3 is a graphical representation of a cross-sectional view of how the soft goods are attached to the child safety seat in accordance with one example embodiment of the disclosure.
Figure 4A:
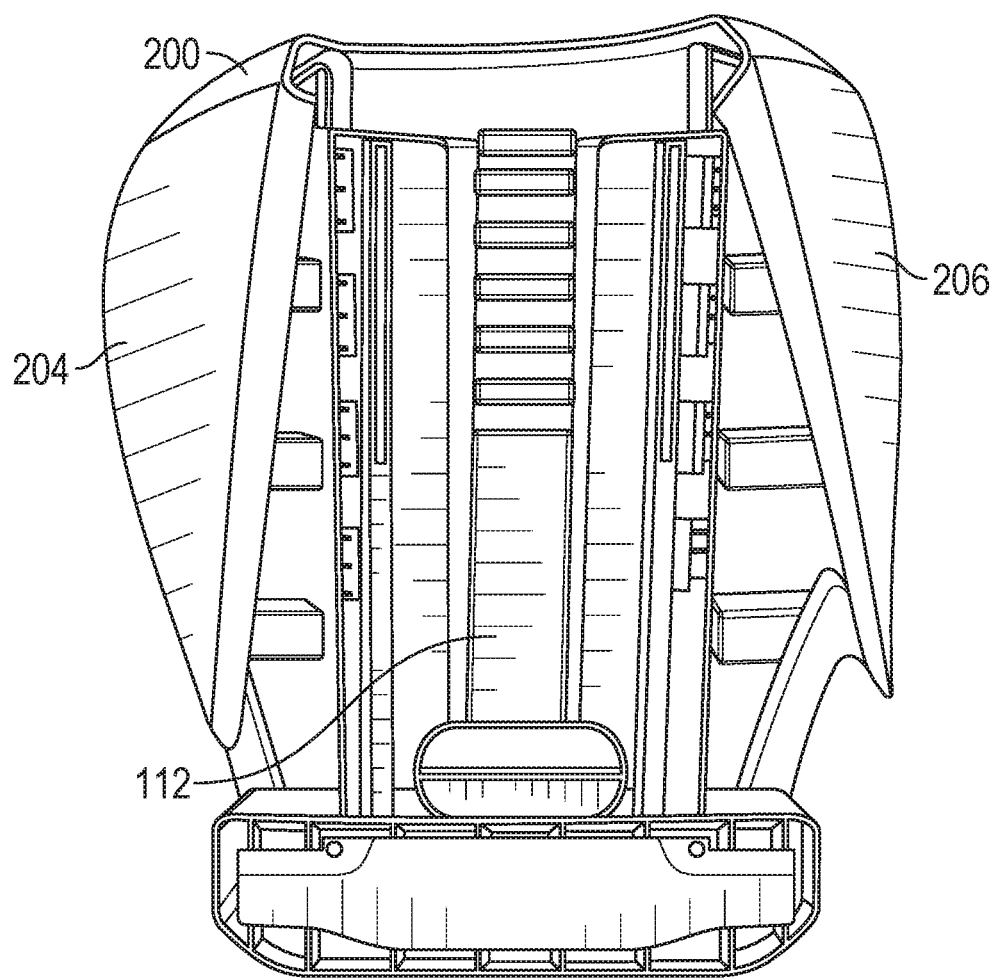
FIGS. 4A-C are multiple views showing a method for attaching the soft goods seat back panel of FIG. 2 to the child safety seat of FIGS. 1A-F in accordance with one example embodiment of the disclosure.
Figure 4B:
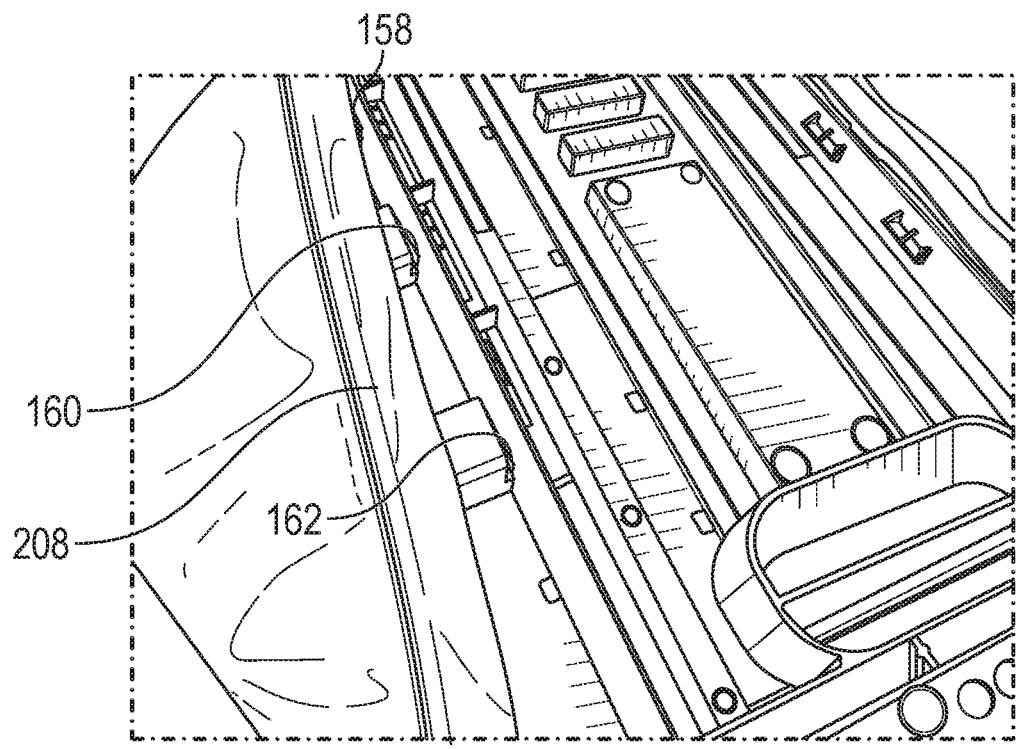
Figure 4C:
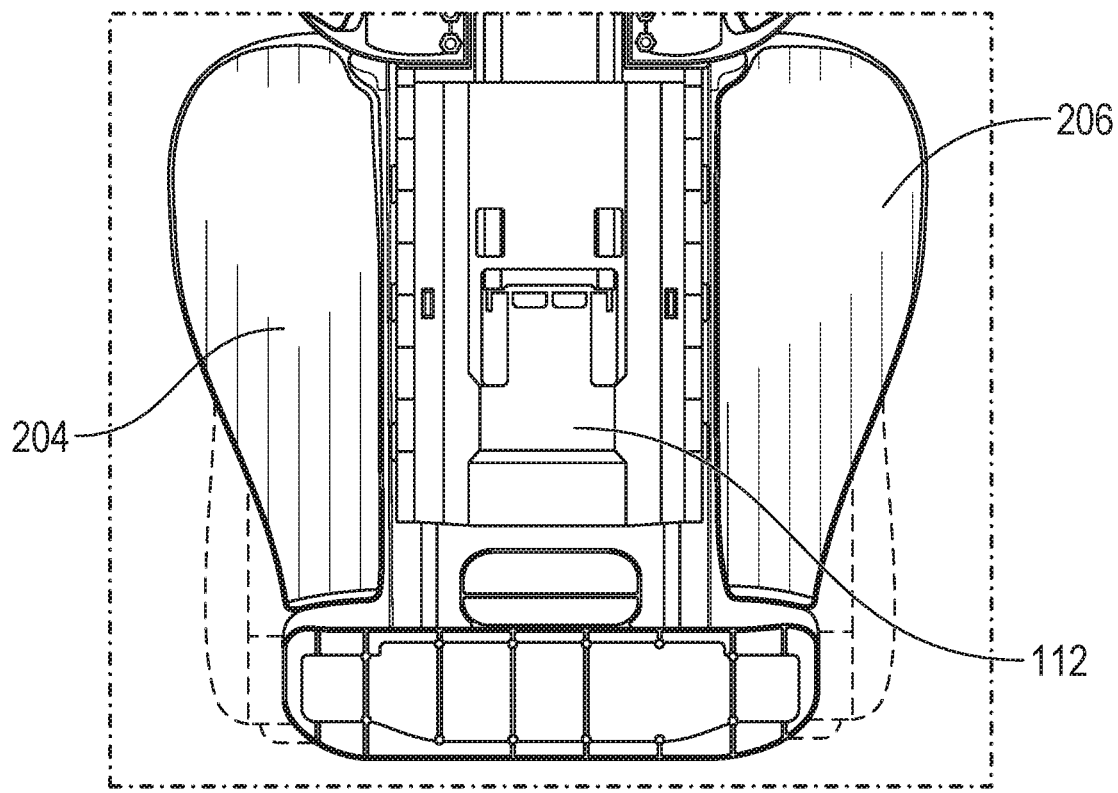

FIG. 3 is a graphical representation of a cross-sectional view showing the elongated member inserted into one of the cavities of the seat back 112 or another shell according to one example embodiment of the disclosure. FIGS. 4A-C are multiple views showing a method for attaching the soft goods component presented in the form of an example soft good seat back panel 200 to the seat back 112 or other shell according to one example embodiment. Referring now to FIGS. 1A-4C, as best viewed in FIGS. 3-4C, the front-facing panel 202 is placed up against the front side 119 of the seat back 112 or other shell. Next, the one or both of the first rear-facing panel 204 and second rear-facing panel 206 are tensioned around the respective sides of the seat back 112 or other shell and lateral support 116 (if included). For example, the first rear-facing panel 204 can be tensioned around the side and lateral support 116 of the seat back 112 or other shell and across the respective generally horizontally-extending rib 142, 144, or 146. The elongated member 216 inside the channel 208 can then be inserted (either one at a time or simultaneously) into each of the cavities 158, 160, 162 in a press-fit fashion to secure the first rear-facing panel 204 to the back side 121 of the seat back 112 or other shell. In addition, the second rear-facing panel 206 can be tensioned around the side and lateral support 116 of the seat back 112 or other shell and across the respective generally horizontally-extending rib 148, 150, or 152. The elongated member 216 inside the channel 210 can be manually inserted into each of the cavities 164, 166, 168 in a press-fit fashion to secure the second rear-facing panel 206 to the back side 121 of the seat back 112 or other shell. The method outlined above can be reversed to removably decouple the soft goods component from the seat back 112 or other shell. Removal of the soft goods component may be desired in order to clean the soft goods component or replace the soft goods component with another soft goods component.

While the example embodiment of FIGS. 1A-4C is shown and described with reference to the attachment of seat back soft goods to a child safety seat, this is for example purposes only, as the concepts described herein also can be applied to the attachment of soft goods components to the seat base, arm rests, the seat back or any combination thereof of the child safety seat 100 or any other child apparatus, including, but not limited to, child safety seats, child car safety seats, child vehicle booster seats (either with or without a seat back), infant carrier systems, child high chairs, children's rockers (wither motorized or non-motorized), bassinets, children's playards, strollers, infant jumpers, children's swings, infant bouncers, infant sleepers, and cribs, and including the child safety seat shown and described in FIGS. 5A-F.

FIGS. 5A-F present various views of another embodiment for removably coupling soft goods components to a child apparatus presented in the form of an example child safety seat 500 in accordance with one example embodiment of the disclosure. The child safety seat shown and described in FIGS. 5A-F varies in certain ways from the child safety seat 100 of FIG. 1A-F. However, the concepts disclosed herein could equally be used, if desired, on the child safety seat 100 or any other form of child apparatus (e.g., child safety seats, child car safety seats, child vehicle booster seats (either with or without a seat back), infant carrier systems, child high chairs, children's rockers (wither motorized or non-motorized), bassinets, children's playards, strollers, infant jumpers, children's swings, infant bouncers, infant sleepers, cribs, etc.) and the concepts described with regard to attaching soft goods components on the child safety seat 100 could be applied to the child safety seat 500 of any other child apparatus. In certain example embodiments, soft goods components could be applied to a child apparatus using portions of both the concept described with reference to FIGS. 1A-4C and the concept described with reference to FIGS. 5A-F.

Figure 5A:
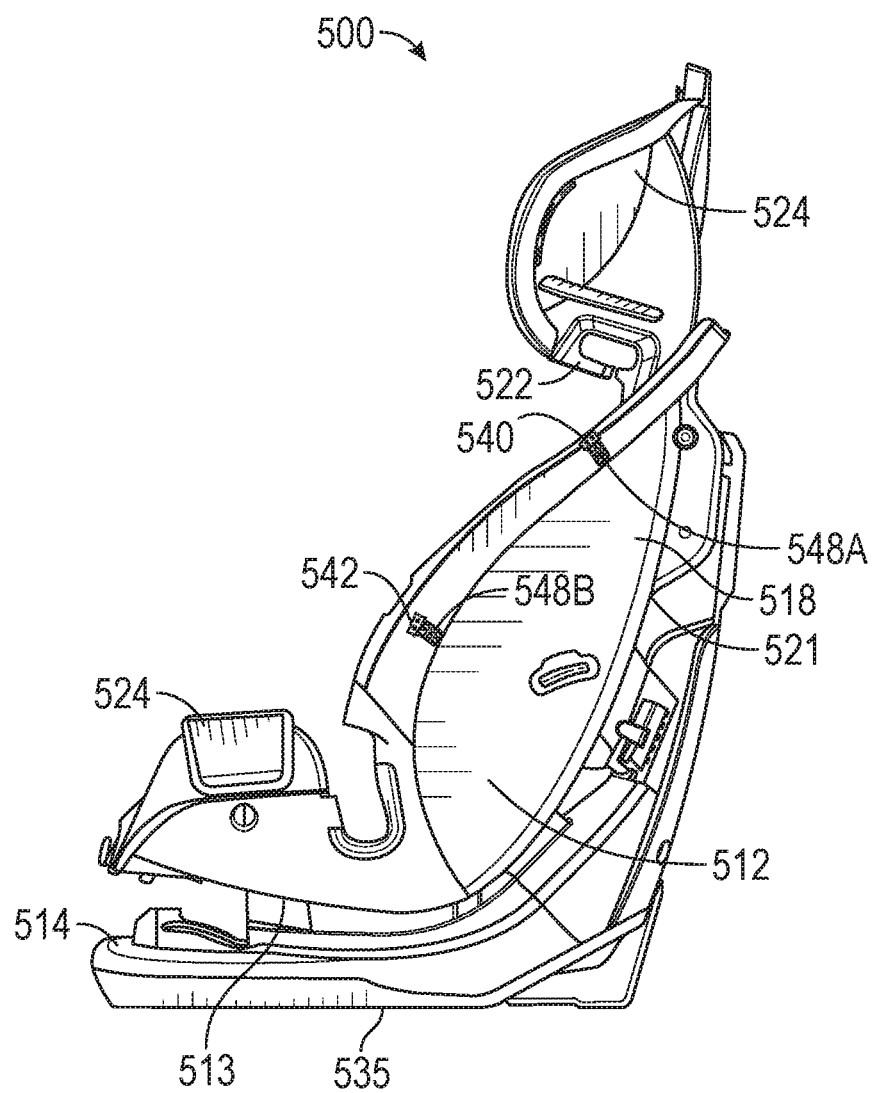
FIG. 5A is a side elevation view of another child apparatus in the form of a child safety seat constructed in accordance with another example embodiment of the disclosure.

Referring now to FIGS. 5A-F, the child apparatus presented in the form of an example child safety seat 500 can include a seat shell 512 or other shell and seat base 514. In some example embodiments, the seat shell 512 or other shell may be formed as one unitary piece. In other example embodiments, seat shell 512 or other shell may be formed of two or more pieces, such as a backrest 518 and seat bottom 513, that are joined together during manufacturing or by a parent/caregiver. The seat shell 512 or another shell may be fixedly, removably, and/or rotatably coupled to the seat base 514. For example, as shown in FIG. 5A, the seat shell 512 or another shell can rotate along the arc A-B with respect to the seat base 514.

The seat base 514 can include a bottom surface 535. The bottom surface 535 can be configured to rest upon the top surface of the vehicle seat (not shown), as understood by those of ordinary skill in the art. The seat bottom 513 can include a top surface 534 that is configured to be sat upon by a child. In certain example embodiments, the top surface 534 can be angled downward from the front of the seat bottom 513 towards the back of the seat bottom 513 to better position the child within the child safety seat 500 or other child apparatus. All or a portion of the top surface 534 can also be covered in padding and/or soft goods (e.g., fabric, vinyl, plastic, leather, faux leather, etc.) to increase the comfort of the top surface 134 of the seat base 114.

In addition, the child apparatus presented in the form of an example child safety seat 500 can also include one or more cup holders 524. In one example, a cup holder 524 is provided on opposing lateral sides of the seat shell 512. Each cup holder 524 can be fixedly, rotatably, and/or removably coupled to the seat shell 512 or another shell. In some example embodiments, each cup holder 524 may be coupled to the seat shell 512 and can extend generally vertically upward from the seat bottom 513. In other example embodiments, the child apparatus presented in the form of an example child safety seat 500 can include armrests (not shown) in addition to or in the alternative to the cup holders 524. The armrests can be the same, similar, or different than the armrests 120 described in FIGS. 1A-F.

The child apparatus presented in the form of an example child safety seat 500 may also include one or more lap belt guides 524. Each lap belt guide 526 is configured to properly position the vehicle lap belt (e.g., from a vehicle 3-point seat belt (not shown)) across the lap of the child when the child is sitting on the top surface 534 of the seat bottom 513 of the child safety seat 500. In certain example embodiments, each lap belt guide 526 is positioned adjacent to a leading edge of each lateral side of the backrest 518 and along the top surface 534 of the seat bottom 513. In one example, the lap belt guide 526 creates a transition surface and/or opening between the leading edge of the lateral side of the backrest 518 and the portion of the seat shell 512 or another shell to which the cup holder 524 is attached for properly positioning the lap belt (not shown). In one example embodiment, the lap belt guide 526 may include a flat or rounded surface the lap belt extends over and abuts. In another example embodiment, the lap belt guide 526 may include additional features to secure or otherwise direct the lap belt.

The seat shell 512 or another shell can also include a backrest 518 that extends generally vertically upward with respect to the seat bottom 513. The backrest 518 can include a front side 519 and an opposing back side 521. The front side 519 of the backrest 518 can be configured to receive a portion of a child's back thereon. In one example, the seat bottom 513 and the seat back 518 define a child receiving area for the child safety seat 500. All or a portion of the backrest 518 can include soft goods (e.g., fabric, vinyl, plastic, leather, faux leather, etc. and can be also include foam or other cushioning material that fills all or a portion of the soft goods material) to increase the comfort of the front side 519 of the backrest 518.

In some example embodiments, the seat shell 512 or another shell may contain a pair of lateral supports 516. Each lateral support 516 can be positioned along opposing, vertically extending side edges of the backrest 518. Each lateral support 516 can be integrally formed with or coupled to the backrest 518. Each lateral support 516 can be positioned generally between the seat bottom 513 and the headrest 524. Each lateral support 516 can also extend from the backrest 518 and generally forward from the front side 519 of the backrest 518 to help keep the child securely positioned within the outer boundaries of the child safety seat 500 or another child apparatus during lateral acceleration or deceleration.

Figure 5B:
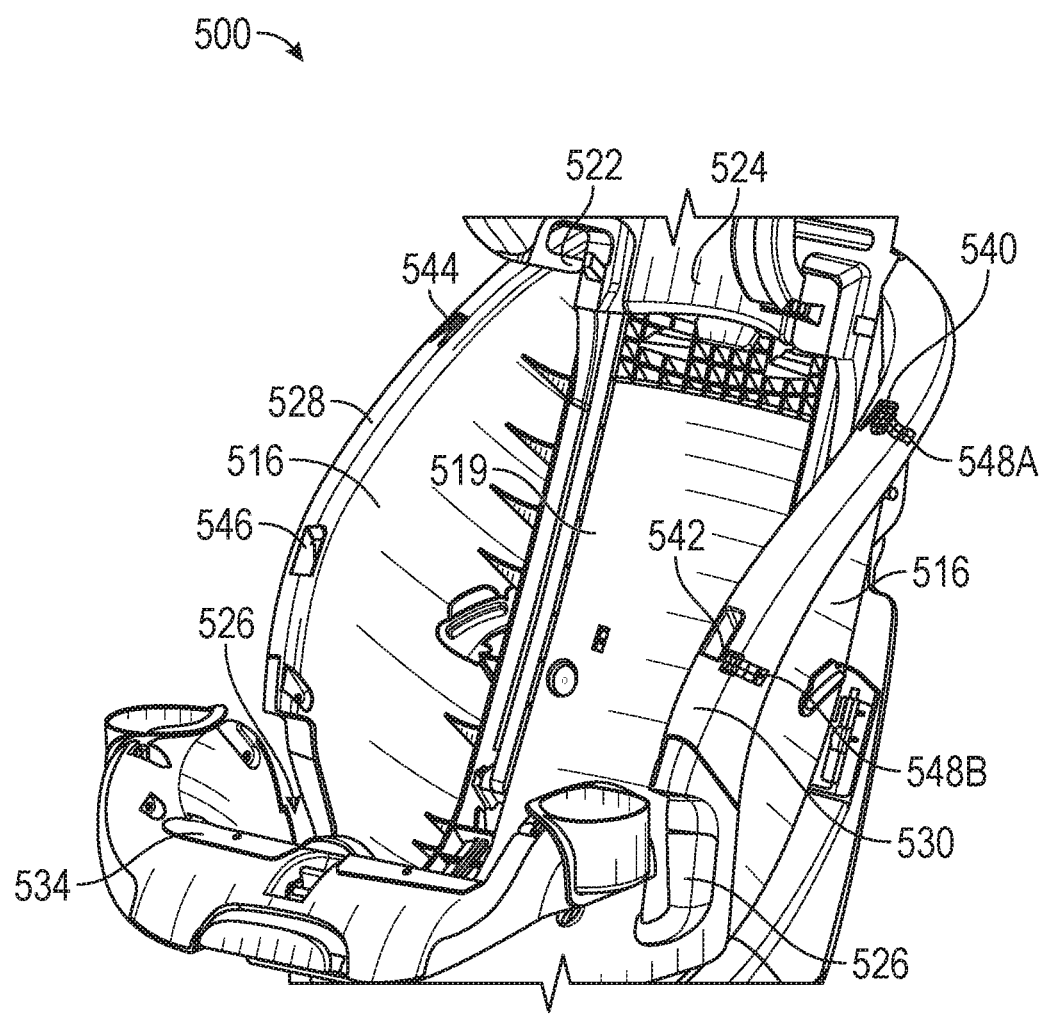
FIG. 5B is a partial perspective view of the child safety seat of FIG. 5A.
Figure 5C:
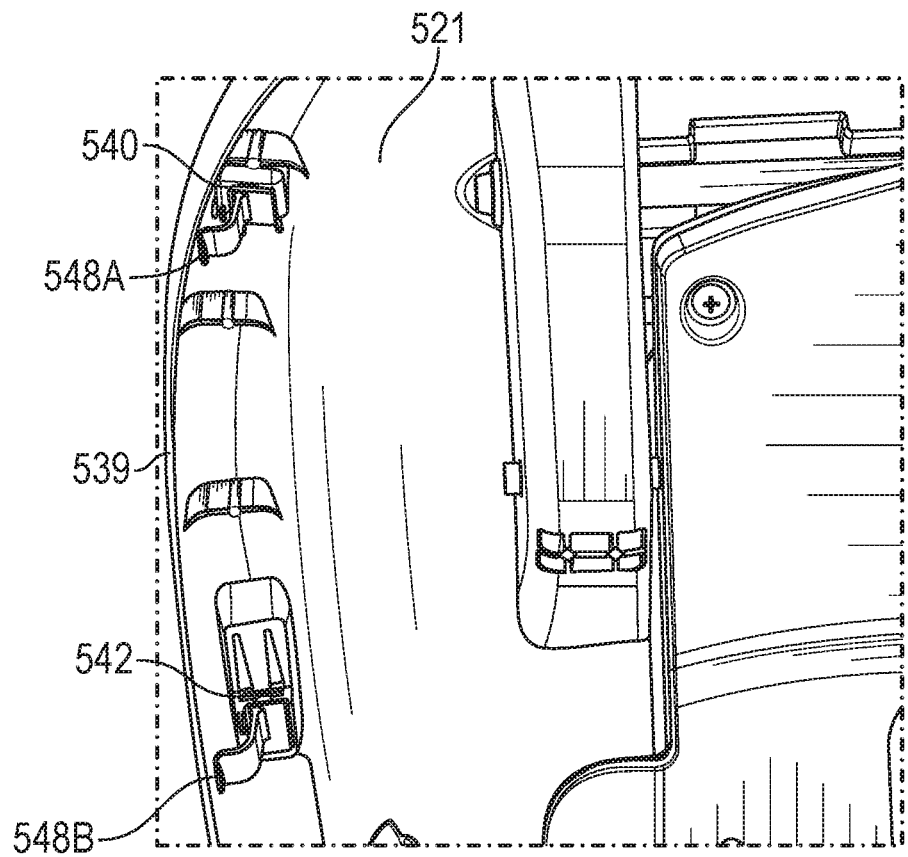
FIG. 5C is a partial rear perspective view of the child safety seat of FIGS. 5A-B.
Figure 5D:
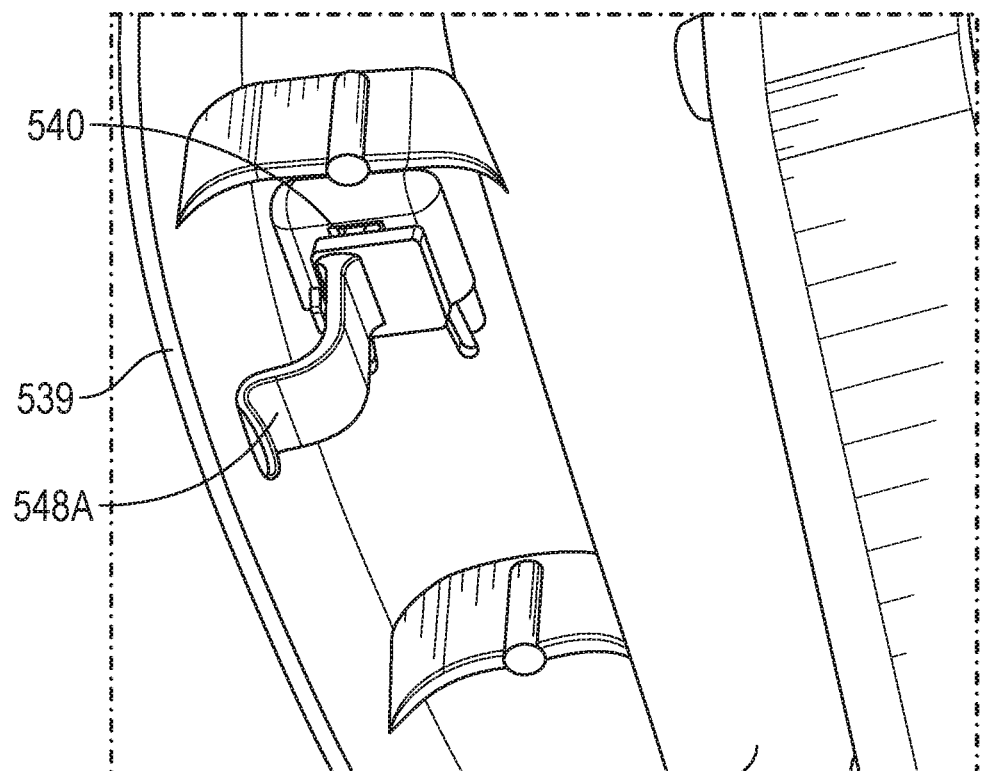
FIG. 5D is a partial rear perspective view of the child safety seat of FIGS. 5A-C, focusing on the soft goods retaining tab in accordance with one example embodiment of the disclosure.

The child safety seat 500 may also include other elements that guide and position the vehicle's three-point seatbelt (not shown). In one example embodiment, the child apparatus presented in the form of an example child safety seat 500 includes one or more shoulder belt guides 522. Each shoulder belt guide 522 can be positioned along the backrest 118 of the seat shell 512 or another shell near or adjacent the headrest 524 and generally above the lateral support 516 so as to be positioned near each of the occupant's shoulders, as shown in FIG. 5A. The shoulder belt guide 522 may be coupled to or integrally formed with the backrest 518, or the headrest 524 and can be positioned between the backrest 518 and the headrest 524. As shown in FIGS. 5A-B, each shoulder belt guide 522 is integrally formed with the headrest 524.

Each shoulder belt guide 522 may include a channel, for example, an oblong channel, that the seatbelt can pass freely therethrough. In some example embodiments, the outer wall of the shoulder belt guide 522 may have an opening or a break in the wall to allow the seatbelt to be fed into the channel of the shoulder belt guide 522 while making it difficult for the belt to be unintentionally removed from the guide 522. Once the seatbelt is in place within the channel of the shoulder belt guide 522, the shoulder belt guide 522 can maintain the shoulder belt in the proper position across the child's torso while still allowing the belt to be extended and retracted during buckling and unbuckling of the child into the child safety seat 500 or another child apparatus. Other example embodiments of the child apparatus (e.g., child safety seats, child car safety seats, child vehicle booster seats (either with or without a seat back), infant carrier systems, child high chairs, children's rockers (wither motorized or non-motorized), bassinets, children's playards, strollers, infant jumpers, children's swings, infant bouncers, infant sleepers, cribs, etc.) may utilize different shoulder belt guide configurations. For example, a strap with one end fixed to the child apparatus may be looped over the seatbelt with the other end removably snapped or coupled to the child apparatus. In other example embodiments, the shape of the headrest 524, backrest 518, and/or lateral supports 516 may provide an integrated pathway to guide and secure the shoulder belt.

In certain example embodiments, the seat shell 512 or another shell of a child apparatus may be adjustable to fit different occupants and vehicles. In one example, the child apparatus presented in the form of an example child safety seat 500 may include a vertically adjustable headrest 524 that may be slidably or otherwise vertically adjustably coupled to the seat shell 512 (e.g., the backrest 518) or another shell of the child apparatus to fit occupants of different heights. The headrest 524 can include a lever configured to decouple the headrest 524 from the seat shell 512 or another shell and allow the headrest 524 to be vertically adjusted up or down with respect to the backrest 518. Releasing the lever can then allow the headrest 524 to lock in one of multiple vertical positions along the seat shell 512 or another shell of the child apparatus.

As discussed above, the seat shell 512 or another shell of the child apparatus can be selectively pivotally attached to the seat base 514, allowing the seat shell 512 or another shell to be reclined at different seat back angles (with respect to the seat base 514 or another shell). In certain example embodiments, the seat shell 512 or other shell and seat base 514 or another shell may be selectively removable, allowing the seat shell 512 to be separated from the seat base 514 or a first shell to be separated from a second shell.

The seat shell 512 or another shell of the child apparatus can also include multiple tab retaining slots 540, 542, 544, and 546 provided along the back side 521 of the backrest 518 or another portion of the shell. In one example, two tab retaining slots 540, 542 are provided adjacent the left lateral edge of the backrest 518, and two tab retaining slots 544, 546 are provided adjacent to the right lateral edge of the backrest 518. However, the number and precise positioning of the tab retaining slots 540, 542, 544, and 546 is provided for example only. In other example embodiments, the number of tab retaining slots provided along each lateral side or along the back side of the child safety seat 500 or another child apparatus can be greater or less than two and the position of each slot can be more centrally positioned and/or can additionally be provided along or adjacent to the lateral edge of the seat bottom 534 of the seat shell 512 or another shell.

Figure 5E:
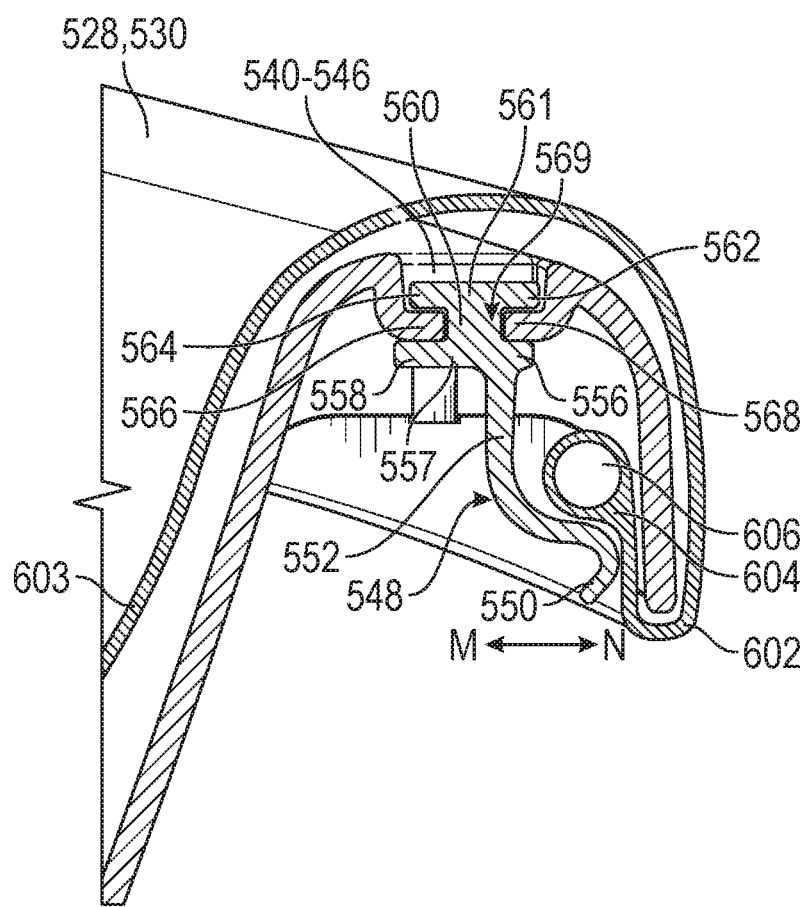
FIG. 5E is a cross-sectional view of the soft goods retaining tab and tab retaining slot of FIGS. 5A-D in accordance with one example embodiment of the disclosure.

As best seen in FIG. 5E, each tab retaining slot 540, 542, 544, and 546 can include an elongated slot 569 or passageway having an open end on one end of the slot 569 and a closed end on the opposing end of the slot 569. Each tab retaining slot 540, 542, 544, and 546 also include a first channel wall 566 and an opposing second channel wall 568. In one example, the space between the first channel wall 566 and the second channel wall 568 define the elongated slot 569.

Each tab retaining slot 540, 542, 544, and 546 is configured to slidably receive therein a soft goods retaining tab 548 (548A and 548B shown, 548C, and 548D not shown, each collectively referred to as 548). Providing soft goods retaining tabs 548 that are removable and therefore removably coupled to the backrest 518 or another shell of the child apparatus via the corresponding tab retaining slot 540, 542, 544, and 546 allows for replacement of one or more specific soft goods retaining tabs 548 if they were to break or stop working properly. In other example embodiments, the soft goods retaining tabs 548 can be removably or fixedly coupled, and/or integrally formed with the backrest 518 or another portion of the seat shell 512 or another shell of the child apparatus. For example, each soft goods retaining tab 548 can be coupled to the backrest 518 or another portion of the seat shell 512 via coupling devices (e.g., screws, bolts, rivets, snaps). In another example embodiment, one or more of the soft goods retaining tabs 548 can be integrally formed with the seat shell 512 or another shell of the child apparatus or over-molded onto the seat shell 512 or another shell of the child apparatus. In yet other example embodiments, any other means for attaching known to one of ordinary skill in the art may be used to couple the soft goods retaining tabs 548 to the seat shell 512 or another shell of the child apparatus.

Figure 5F:
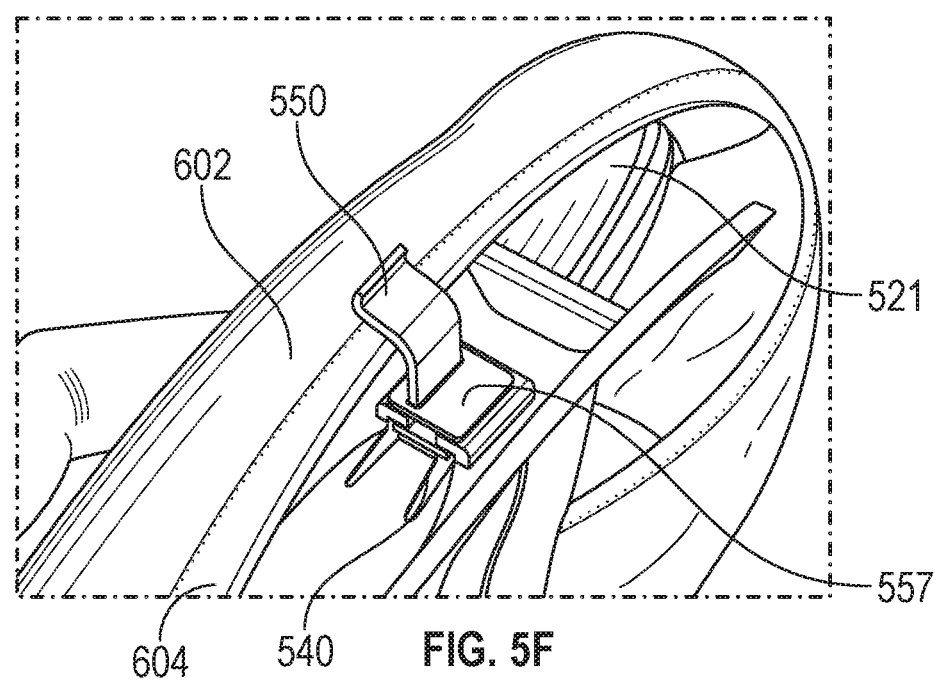
FIG. 5F is another partial perspective view of the child safety seat of FIGS. 5A-E, showing the soft goods component removably coupled to the soft goods retaining tab in accordance with one example embodiment of the disclosure.

Each soft goods retaining tab 548 can include a spring lever 552 or other resilient member, a retaining member 550 coupled to the spring lever 552 and provided along one end of the spring lever 552, and a connecting tab 557 coupled to the spring lever 552 and provided along the distal second end of the spring lever 552. In one example, the retaining member 550 has a hook shape or C-shape and is configured to be positioned against the surface of the back side 521 of the seat shell 512 or another shell of the child apparatus. While the example embodiment shows the retaining member 550 having a hook shape or C-shape, that is for example purposes only as other shapes (e.g., curved, straight, circular, etc.) are contemplated as part of this disclosure. Further, while the example embodiment of FIGS. 5E-F shows the retaining member 550 positioned along the lateral edge of the backrest 518 or other portion of the seat shell 512, that is also only for example purposes, as the retaining member 550 can be located along other portions of the seat shell 512 or another shell of the child apparatus to hold a portion of the soft goods component 602 in place, as described in greater detail below.

The spring lever 552 and the retaining member 550 are spring-biased in the direction N. A user can manually move the retaining member 550 in the direction M in order to insert a portion of the soft goods 602 as discussed in greater detail below. Once inserted, the spring lever 552 will spring bias the retaining member 550 back in the direction N towards the surface of the back side 521 of the backrest 518 and/or seat shell 512 (or another shell of the child apparatus) to retain the portion of soft goods component 602 placed between the soft goods retaining tab 548 and the back side 521 of the backrest 518 and/or seat shell 512.

The connecting tab 557 can have a variety of shapes and can be modified based on the particular shape of the tab retaining slot 540, 542, 544, and 546. In one example embodiment, the connecting tab 557 of the soft goods retaining tab 548 can be generally "I" or "T" shaped. One example of an I-shaped connecting tab 557 is shown in FIG. 5E. As shown, the connecting tab 557 can include a first planar or substantially planar member 560 having a bottom end and a distal top end. A first flange member 556 can extend orthogonally or substantially orthogonally out in a first direction from the bottom end of the member 560. A second flange member 558 can extend orthogonally or substantially orthogonally out from the bottom end of the member 560 in a second direction opposite the first direction. The spring lever 552 can be coupled to the member 560 anywhere between the opposing ends of the flange members 556, 558.

A third flange member 562 can extend orthogonally or substantially orthogonally out from the top end of the member 560 in the first direction. A fourth flange member 564 can extend orthogonally or substantially orthogonally out from the top end of the member 560 in the second direction opposite the first direction. The width of the top portion 561 of the connecting tab 557 from an end of the third flange member 562 to and end of the fourth flange member 564 is greater than the width of the member 560. In addition, the width of the bottom portion of the connecting tab 557 from an end of the first flange member 556 to an end of the second flange member 558 can also be greater than the width of the planar or substantially planar member 560. In example embodiments where the connecting tab 557 is T-shaped, the first flange member 556 and the second flange member 566 can be eliminated.

The elongated slot 569 can have a width that is greater than the width of the member 560 but less than the width of the top portion 561 of the connecting tab 557. The difference in widths between the top portion 561 of the connecting tab 557 and the width of the member 560 allows the member 560 to be slidably inserted into the elongated slot 569 between the first channel wall 566 and the second channel wall 568 and prevents the top portion of the connecting tab 557 from being pulled out directly through the elongated slot 569 rather than being slid out through the open end of the elongated slot 569.

The soft goods component 602 can be the same or similar to that described with reference to FIG. 2. For example, the soft goods component 602 can be configured to be removably coupled to the child safety seat of FIGS. 5A-F or another child apparatus (e.g., child safety seats, child car safety seats, child vehicle booster seats (either with or without a seat back), infant carrier systems, child high chairs, children's rockers (wither motorized or non-motorized), bassinets, children's playards, strollers, infant jumpers, children's swings, infant bouncers, infant sleepers, cribs, etc.). The soft goods component 602 can include a front-facing panel 603 that is configured to abut at least a portion of the front side 519 of the backrest 518. All or a portion of soft goods component 602 can include soft-goods material (e.g., fabric, vinyl, plastic, leather, faux leather, etc. and can be also include foam or other cushioning material that fills all or a portion of the soft goods material) that can include elastic material.

The front-facing panel 603 can be sized and shaped to cover all or a portion of the front side 519 of the backrest 518 of the seat shell 512 or another shell of a child apparatus. An enclosed channel or tunnel 604 can be provided along all or a portion of the outer perimeter of the soft goods component 602. The channel or tunnel 604 can include an elongated passageway configured to receive therein an elongated member(s) 606. For example, the elongated member(s) 606 can be slidably inserted into the passageway defined by the tunnel 604. The elongated member(s) 606 can be made, for example, of plastic, metal, metal alloy, composites, and/or wood. In one example, the elongated member(s) 606 is made of extruded plastic. The elongated member(s) 606 is typically stiffer and less pliable than the rest of the soft goods component 602, or at least the soft goods material, and is able to maintain its shape under the mild compression that can be applied by the retaining member 550. However, the elongated member(s) 606 is also bendable under the force of a parent/caregiver or other user to bend it into the desired shape for installation. Typically, the dimensions of the elongated member(s) 606 will be greater than the gap provided between the back side 521 of the seat shell 512 or another shell of the child apparatus and the closest portion of the retaining member 550 to the back side 521 when the retaining member is biased into the N direction. Each elongated member(s) 606 can have an elongated body with a cross-sectional shape. The cross-sectional shape can be rectangular, square, trapezoidal, oval, circular, or any other geometric shape.

In another example embodiment, rather than a single channel or tunnel 604 along the outer perimeter edge of the soft goods component 602, multiple shorter tunnels or channels can be provided along the perimeter edge of the soft goods component 602 at positions where that portion of the soft goods is adjacent the soft goods retaining tab 548 and multiple correspondingly shorter elongated member(s) 606 can be inserted into each respective shorter tunnel or channel. In certain examples, each tunnel or channel can be enclosed by closing off each respective end and the elongated member(s) can be sealed within the respective tunnel or channel.

To install the soft goods component 602 onto the child safety seat 500 or another child apparatus (e.g., child safety seats, child car safety seats, child vehicle booster seats (either with or without a seat back), infant carrier systems, child high chairs, children's rockers (wither motorized or non-motorized), bassinets, children's playards, strollers, infant jumpers, children's swings, infant bouncers, infant sleepers, cribs, etc.), a user (e.g., parent/caregiver) can place the front-facing panel 603 up against the front side 519 of the backrest 518 and/or the entire seat shell 512 or another shell of a child apparatus. Next, the outer perimeter of the soft goods, including the tunnel(s) 604 with the elongated member(s) 606 therein is stretched around the outer edge 528, 530 of the seat shell 512 or another shell of a child apparatus and towards the back side 521 of the seat shell 512 or another shell of a child apparatus. For each soft goods retaining tab 548 provided on the seat shell 512 (e.g., along the perimeter of the back side 521 of the seat shell 512) or another shell of a child apparatus, the user can either apply a force on the retaining member 550 in the direction M or press the elongated member 606 between the retaining member 550 and the back side 521 to move the retaining member 550 in the direction M. The elongated member(s) 606 can then be pushed further until it fully passes by the retaining member 550 and between the retaining member 550 and the back side 521 of the seat shell 512 or another shell of a child apparatus. The spring-biasing of the spring lever 552 on the retaining member 550 will force the retaining member back into the N direction and trap the elongated member(s) 606 and at least a portion of the tunnel section 604 of the soft goods component 602 within an area between the soft goods retaining tab 548 and the back side 521 of the seat shell 512 or another shell of a child apparatus.

To remove the soft goods component 602 from the child safety seat 500 or another child apparatus, the user can pull the portion of the soft goods component 602 with the elongated member(s) 606 past the retaining member 550 with a force sufficient to move the retaining member in the direction M or can manually move the retaining member 550 in the direction M until sufficient space is provided between the retaining member 550 and the back side 521 for the elongated member(s) 606 to pass between the retaining member 550 and the back side 521. The user may then pull the tunnel portion 604 and elongated member over the outer edge 528, 530 and away from the front side 519 of the seat shell 512 or another shell of the child apparatus.

If the soft goods retaining tab 548 were to break or stop operating properly (e.g., due to a reduction in biasing force), the user can slidably remove the soft goods retaining tab 548 from the tab retaining slot 540, 542, 544, or 546 and can then slidably insert a new soft goods retaining tab member 548 into the corresponding tab retaining slot 540, 542, 544, or 546.

While the example embodiment of FIGS. 5A-F is shown and described with reference to the attachment of seat back soft goods to a child safety seat, this is for example purposes only, as the concepts described herein also can be applied to the attachment of soft goods components to the seat base, arm rests, the seat back or any combination thereof and/or to any other shell or portion of another child apparatus (e.g., child safety seats, child car safety seats, child vehicle booster seats (either with or without a seat back), infant carrier systems, child high chairs, children's rockers (wither motorized or non-motorized), bassinets, children's playards, strollers, infant jumpers, children's swings, infant bouncers, infant sleepers, cribs, etc.). In addition, while the example embodiment of FIGS. 5A-F is shown and described as having four soft goods retaining tabs 548 position as two each along each lateral side of the seat shell 512 or another shell of a child apparatus, this is also for example purposes only as the positioning of the soft goods retaining tabs 548 can be along any portion of the shell and the number of soft goods retaining tabs 548 can be any number between 1-100 and can be positioned in any order or arrangement along the seat shell 512, any other member of the child safety seat 500, or any other shell or portion of another child apparatus.

Though the disclosed examples include particular arrangements of a number of parts, components, features, and aspects, the disclosure is not limited to only those examples or arrangements shown. Any one or more of the parts, components, features, and aspects of the disclosure can be employed alone or in other arrangements of any two or more of the same.

Although certain features, functions, components, and parts of a child apparatus have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A child apparatus comprising:
 a child receiving area;
 at least two cavities in the child receiving area, wherein the child receiving area comprises
  a first substantially horizontal support rib; and
  a first substantially vertical support rib;
  wherein at least one first cavity of the at least two cavities is defined by a space between the first substantially horizontal support rib and the first substantially vertical support rib; and
 a soft goods component covering at least a portion of the child receiving area, the soft goods component comprising:
  a soft goods material;
  the first substantially horizontal support rib coupled to the soft goods material and removably coupled to the at least one first cavity of the at least two cavities; and
  the first substantially vertical support rib coupled to the soft goods material and removably coupled to at least one second cavity of the at least two cavities.

2. The child apparatus of claim 1, wherein the child apparatus comprises a child safety seat comprising:
 a seat back comprising:
  a front side;
  an opposing back side;
  the at least one first cavity disposed along a first portion of the seat back; and
  the at least one second cavity disposed along a second portion of the seat back;

a seat bottom,
wherein the seat back and the seat bottom define the child receiving area.

3. The child apparatus of claim 2, wherein the seat back further comprises:
a first substantially horizontal support rib; and
a first substantially vertical support rib;
wherein the at least one first cavity is defined by a space between the first substantially horizontal support rib and the first substantially vertical support rib.

4. The child apparatus of claim 3, wherein the at least one first cavity comprises a first cavity, a second cavity, and a third cavity, and
wherein the seat back further comprises:
a second substantially horizontal support rib;
a third substantially horizontal support rib;
wherein the first cavity is defined by a first space between the first substantially horizontal support rib and the first substantially vertical support rib,
wherein the second cavity is defined by a second space between the second substantially horizontal support rib and the first substantially vertical support rib, and
wherein the third cavity is defined by a third space between the third substantially horizontal support rib and the first substantially vertical support rib.

5. The child apparatus of claim 4, wherein the at least one second cavity comprises a fourth cavity, a fifth cavity, and a sixth cavity, and
wherein the seat back further comprises:
a fourth substantially horizontal support rib;
a fifth substantially horizontal support rib;
a sixth substantially horizontal support rib; and
a second substantially vertical support rib;
wherein the fourth cavity is defined by a fourth space between the fourth substantially horizontal support rib and the second substantially vertical support rib,
wherein the fifth cavity is defined by a fifth space between the fifth substantially horizontal support rib and the second substantially vertical support rib, and
wherein the sixth cavity is defined by a sixth space between the sixth substantially horizontal support rib and the second substantially vertical support rib.

6. The child apparatus of claim 1, wherein the soft goods component further comprises:
a first channel extending though at least a first portion of the soft goods material;
a second channel extending through at least a second portion of the soft goods material;
wherein the first elongated stiffening member is disposed within the first channel and wherein the second elongated stiffening member is disposed within the second channel.

7. The child apparatus of claim 6, wherein the first elongated stiffening member and the second elongated stiffening member are constructed of one of plastic, metal, composite, or wood.

8. The child apparatus of claim 1, wherein the child apparatus is one of a child car seat, an infant carrier system, a child vehicle booster seat, a swing, a bouncer, a crib, a playpen, a rocker, a playard, a high chair, a stroller, a bassinet, a sleeper, or a jumper.

9. A child apparatus comprising:
a shell comprising a child receiving area comprising
at least one first substantially horizontal support rib; and
at least one first substantially vertical support rib;
wherein at least one first cavity of the at least two cavities is defined by a space between the at least one first substantially horizontal support rib and the at least one first substantially vertical support rib; and
a plurality of soft goods retaining tabs, each of the plurality of soft goods retaining tabs coupled to the shell;
a soft goods component comprising soft goods material;
wherein the at least one substantially horizontal support rib or the at least one substantially vertical support rib is removably coupled between each of the plurality of soft goods retaining tabs and the shell.

10. The child apparatus of claim 9, wherein the child apparatus is one of a child car seat, an infant carrier system, a child vehicle booster seat, a swing, a bouncer, a crib, a playpen, a rocker, a playard, a high chair, a stroller, a bassinet, a sleeper, or a jumper.

11. The child apparatus of claim 9, wherein the each of the plurality of soft goods retaining tabs are integrally formed with the shell.

12. The child apparatus of claim 9, wherein each of the plurality of soft goods retaining tabs is coupled to the shell via one of one or more snaps, one or more screws, or one or more rivets.

13. The child apparatus of claim 9, wherein each of the plurality of soft goods retaining tabs is removably coupled to the shell.

14. The child apparatus of claim 13, wherein the shell further comprises a plurality of tab retaining slots, each tab retaining slot disposed along a back side of the shell, wherein each of the plurality of soft goods retaining tabs is removably coupled to a corresponding one of the plurality of tab retaining slots.

15. The child apparatus of claim 9, wherein each of the plurality of soft goods retaining tabs comprises:
a connecting tab; and
a retaining member spring-biased to the connecting tab in a first direction.

16. The child apparatus of claim 15, wherein the connecting tab has one of an I-shaped cross-section and a T-shaped cross-section.

17. The child apparatus of claim 15, wherein the connecting tab comprises:
a first substantially planar member having a top end and a distal bottom end;
a first flange member extending out from the bottom member in the first direction;
a second flange member extending out from the bottom member in a second direction opposite the first direction;
a third flange member extending out from the top member in the first direction;
a fourth flange member extending out from the top member in the second direction.

18. The child apparatus of claim 9, wherein the child apparatus is a child safety seat, wherein the shell comprises a seat shell comprising:
a seat back;
a seat bottom;
a front surface; and
a back side; and
wherein the at least one elongated stiffening member of the soft goods component is removably coupled between each of the plurality of soft goods retaining tabs and the back side of the seat shell.

19. The child apparatus of claim 9, wherein the soft goods component further comprises:

a first channel extending though at least a first portion of the soft goods material;

wherein the at least one elongated stiffening member is disposed within the first channel of the soft goods material.

20. The child apparatus of claim 9, wherein the at least one elongated stiffening member is constructed of one of plastic, metal, composite, or wood.

\* \* \* \* \*